(12) United States Patent
Yoshikawa

(10) Patent No.: US 12,490,315 B2
(45) Date of Patent: Dec. 2, 2025

(54) COMMUNICATION APPARATUS, CONTROL METHOD, AND STORAGE MEDIUM

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 17/848,262

(22) Filed: Jun. 23, 2022

(65) Prior Publication Data

US 2022/0408501 A1    Dec. 22, 2022

Related U.S. Application Data

(63) Continuation of application No. PCT/JP2020/046996, filed on Dec. 16, 2020.

(30) Foreign Application Priority Data

Dec. 24, 2019   (JP) ................................ 2019-233225

(51) Int. Cl.
    *H04W 76/10*     (2018.01)
    *H04W 76/30*     (2018.01)
    *H04W 84/12*     (2009.01)

(52) U.S. Cl.
    CPC ........... *H04W 76/10* (2018.02); *H04W 76/30* (2018.02); *H04W 84/12* (2013.01)

(58) Field of Classification Search
CPC ... H04W 28/04; H04W 72/04; H04W 72/042; H04W 88/08; H04W 76/10; H04W 76/30; H04W 84/12; H04W 5/0007
(Continued)

(56) References Cited

U.S. PATENT DOCUMENTS 11,653,343 B2 *   5/2023   Xin ................... H04W 72/0453
                                                                                         370/329
11,700,623 B2 *   7/2023   Adachi ............. H04W 72/0453
                                                                                         370/329
(Continued)

FOREIGN PATENT DOCUMENTS

CN          110167201 A   *   8/2019   ............ H04W 76/15
CN          110418404 A   *   11/2019   ........ H04W 56/0005
(Continued)

OTHER PUBLICATIONS

English Translation of PCT Written Opinion of the International Searching Authority, Dec. 16, 2020. (Year: 2020).*

(Continued)

*Primary Examiner* — Peter G Solinsky
*Assistant Examiner* — Sanjay K Dewan
(74) *Attorney, Agent, or Firm* — Canon U.S.A., Inc. IP Division

(57) ABSTRACT

In a case where a communication apparatus 102 communicates, via a first frequency channel, an establishment request for establishing a connection with a communication apparatus 103 via a second frequency channel different from the first frequency channel that complies with the same communication standard as a connection via the first frequency channel, or a disconnection request for disconnecting the connection, the communication apparatus 102 establishes or disconnects the connection with the communication apparatus 103 via the second frequency channel.

34 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2009/0323608 | A1* | 12/2009 | Adachi | H04W 72/0453 |
| | | | | 370/329 |
| 2011/0007685 | A1* | 1/2011 | Ma | H04B 7/0639 |
| | | | | 370/329 |
| 2014/0219255 | A1* | 8/2014 | Eyuboglu | H04B 7/04 |
| | | | | 370/336 |
| 2015/0280888 | A1* | 10/2015 | Karsi | H04L 25/0228 |
| | | | | 370/329 |
| 2015/0327276 | A1* | 11/2015 | Rebeiz | H04W 72/52 |
| | | | | 370/329 |
| 2015/0373702 | A1* | 12/2015 | Merlin | H04L 5/0044 |
| | | | | 370/329 |
| 2016/0183253 | A1* | 6/2016 | Merlin | H04L 5/0064 |
| | | | | 370/329 |
| 2018/0014341 | A1 | 1/2018 | Jung | |
| 2019/0053302 | A1 | 2/2019 | Bang et al. | |
| 2019/0335454 | A1 | 10/2019 | Huang et al. | |
| 2022/0167444 | A1* | 5/2022 | Jang | H04W 76/15 |
| 2023/0254802 | A1* | 8/2023 | Kim | H04W 60/04 |
| | | | | 370/329 |

FOREIGN PATENT DOCUMENTS

| | | | | |
|---|---|---|---|---|
| CN | 110519862 | A * | 11/2019 | H04W 74/08 |
| EP | 3720240 | A1 | 10/2020 | |
| JP | 2018050133 | A * | 2/2018 | H04W 72/04 |
| KR | 3 720 240 | A1 * | 10/2020 | H04W 76/27 |
| WO | WO 2019/169094 | A1 * | 2/2019 | H04W 74/00 |

OTHER PUBLICATIONS

Jang, et al., Discussion on Multi-link Setup, IEEE 802.22-19/1509r5, Nov. 2019, (URL: https; //mentor.ieee.org/802.11/dcn/19/11-19-1509-05-00be-discussion-on-multi-link-setup.pptx), pp. 3-10.

Huang, et al., Multi-link setup follow up, IEEE 802.22-19/1823r0, Nov. 2019, (URL: https://mentor.ieee.org/80211/dcn/19/11-19-1823-00-00be-multi-link-setup-follow-up.pptx), pp. 2-6.

Huang, et al., Multi-link Operation Framework, IEEE 802.22-19/0773r8, Nov. 2019, (URL: https://mentor.ieee.org/802.11/dcn/19/11-19-0773-08-00be-multi-linnk-operation-framework.pptx), pp. 5-10.

Shadi Abu-Surra (Samsung), CP-Specification, IEEE 802.11-10-0433r2, Dec. 2010.

Po-Kai Huang, Multi-Link Setup Follow Up, IEEE 802.11-19-1823r0, Nov. 2015.

Insun Jang, Discussion on Multilink Setup, IEEE802.11-19/1509r0, Sep. 2019.

Jang, Insun (LG Electronics); Discussion on Multi-link Setup; IEEE 802.11-19/1509r5; (URL:https://mentor.ieee.org/802.11/dcn/19/11-19-1509-05-00be-discussion-on-multi-link-setup.pptx); Sep. 2019; pp. 1-8.

Abu-Sarra, Shadi, CP-specification, IEEE 802.11-10/0433r2, IEEE, URL:https://mentor.ieee.org/802.11/dcn/10/11-10-0433-02-00ad-cp-specification.docx, 20100517, p. 38,73.

* cited by examiner

FIG.7

Band ID field

| Band ID value | Meaning |
| --- | --- |
| 0 | TV white spaces |
| 1 | Sub-1 GHz (excluding TV white spaces) |
| 2 | 2.4 GHz |
| 3 | 3.6 GHz |
| 4 | 4.9 and 5 GHz |
| 5 | 60 GHz |
| 6 | 45 GHz |
| 7 | 6 GHz |
| 8 | 2.4 GHz + 5 GHz |
| 9 | 2.4 GHz + 6 GHz |
| 10 | 5 GHz + 6 GHz |
| 11 | 2.4 GHz + 5 GHz + 6 GHz |
| 12 – 255 | Reserved |

FIG.11

Disassociation element format

| Element ID | Length | Multi-band Control | Band ID | Operating Class | Channel Number |
|---|---|---|---|---|---|
| 1101 | 1102 | 1103 | 1104 | 1105 | 1106 |

Band ID field

| Band ID value | Meaning |
|---|---|
| 0 | TV white spaces |
| 1 | Sub-1 GHz (excluding TV white spaces) |
| 2 | 2.4 GHz |
| 3 | 3.6 GHz |
| 4 | 4.9 and 5 GHz |
| 5 | 60 GHz |
| 6 | 45 GHz |
| 7 | 6 GHz |
| 8 – 127 | Reserved |

FIG.14A

Next band 1 = 0

| Multi-band Control | Next band 1 | Band ID 1 | Operating Class 1 | Channel Number 1 | BSSID |
|---|---|---|---|---|---|
| 603 | 1301 | 1302 | 1303 | 1304 | 607 |

FIG.14B

Next band 1 = 1, Next band 2 = 0

| Multi-band Control | Next band 1 | Band ID 1 | Operating Class 1 | Channel Number 1 | Next band 2 | Band ID 2 | Operating Class 2 | Channel Number 2 | BSSID |
|---|---|---|---|---|---|---|---|---|---|
| 603 | 1301 | 1302 | 1303 | 1304 | 1301' | 1302' | 1303' | 1304' | 607 |

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2020/046996, filed Dec. 16, 2020, which claims the benefit of Japanese Patent Application No. 2019-233225, filed Dec. 24, 2019, both of which are hereby incorporated by reference herein in their entirety.

BACKGROUND OF THE INVENTION

Field of the Invention

The present invention relates to control of a plurality of connections in a communication apparatus.

Background Art

As wireless communication standards stipulated by the Institute of Electrical and Electronics Engineers (IEEE), IEEE 802.11 series standards have been known. The IEEE 802.11 series standards include standards such as IEEE 802.11a/b/g/n/ac/ax standards.

Patent Literature 1 discusses executing wireless communication using orthogonal frequency division multiple access (OFDMA) in the IEEE 802.11ax standard. In the IEEE 802.11ax standard, by executing wireless communication using the OFDMA, high peak throughput is realized.

In the IEEE, for further increasing throughput and enhancing frequency usage efficiency, the stipulation of the IEEE 802.11be standard has been considered as a new IEEE 802.11 series standard. In the IEEE 802.11be standard, there has been considered a technique by which one access point (AP) establishes connection with one station (STA) in each of a plurality of frequency channels in a 2.4-gigahertz (GHz) band, a 5-GHz band, or a 6-GHz band, and communicates with the STA.

In this manner, in the IEEE 802.11be standard, the technique of performing communication by establishing connection via a plurality of frequency channels in the 2.4-GHz band, the 5-GHz band, and the 6-GHz band has been considered. An AP has been conventionally required to perform processing of connection or disconnection, for example, for each connection. Thus, for example, in a case where an AP establishes a connection in a first frequency channel and a connection in a second frequency channel with a STA, for disconnecting the connection in the second frequency channel, the AP has had to transmit a disconnection request signal for requesting disconnection, via the second frequency channel. Nevertheless, in a case where interference with another communication occurs in the second frequency channel, for example, there has been a possibility that the AP fails to transmit the disconnection request signal to the STA and fails to appropriately control the connection in the second frequency channel.

CITATION LIST

Patent Literature

PTL 1: Japanese Patent Application Laid-Open No. 2018-50133

SUMMARY OF THE INVENTION

The present invention is directed to a technique that can appropriately control connection with another communication apparatus in a frequency channel different from a frequency channel in which a communication apparatus transmits a signal.

In view of the above, according to an aspect of the present invention, a communication apparatus includes an establishment unit configured to establish a connection with another communication apparatus that complies with a predetermined communication standard, a communication unit configured to communicate, via a first frequency channel, information for specifying a connection target related to a connection with the other communication apparatus via a second frequency channel different from the first frequency channel, and a control unit configured to control the establishment unit to establish, based on at least the information for specifying a connection target, a connection with the other communication apparatus via the second frequency channel that is to be maintained concurrently with a connection with the other communication apparatus via the first frequency channel that is established by the establishment unit, after the information for specifying a connection target has been communicated by the communication unit.

According to another aspect of the present invention, a communication apparatus includes an establishment unit configured to establish a connection with another communication apparatus that complies with a predetermined communication standard, a communication unit configured to communicate, in a case where a first connection with the other communication apparatus via a first frequency channel that has been established by the establishment unit, and a second connection with the other communication apparatus via a second frequency channel other from the first frequency channel that has been established by the establishment unit are concurrently maintained, a disconnection request for disconnecting the second connection, via the first connection, and a disconnection unit configured to disconnect the second connection in a case where the disconnection request has been communicated by the communication unit.

Further features of the present invention will become apparent from the following description of exemplary embodiments with reference to the attached drawings.

BRIEF DESCRIPTION OF THE DRAWINGS

FIG. 7 is a diagram illustrating an example of a Band ID field to be communicated by the communication apparatus 102.

FIG. 11 is a diagram illustrating an example of a frame format of a Disassociation element to be transmitted by the communication apparatus 102.

FIG. 14A is a diagram illustrating an example of a case where a predetermined value is included in a Next band field to be communicated by the communication apparatus 102.

FIG. 14B is a diagram illustrating another example of a case where a predetermined value is included in a Next band field to be communicated by the communication apparatus 102.

DESCRIPTION OF THE EMBODIMENTS

Figure 1:
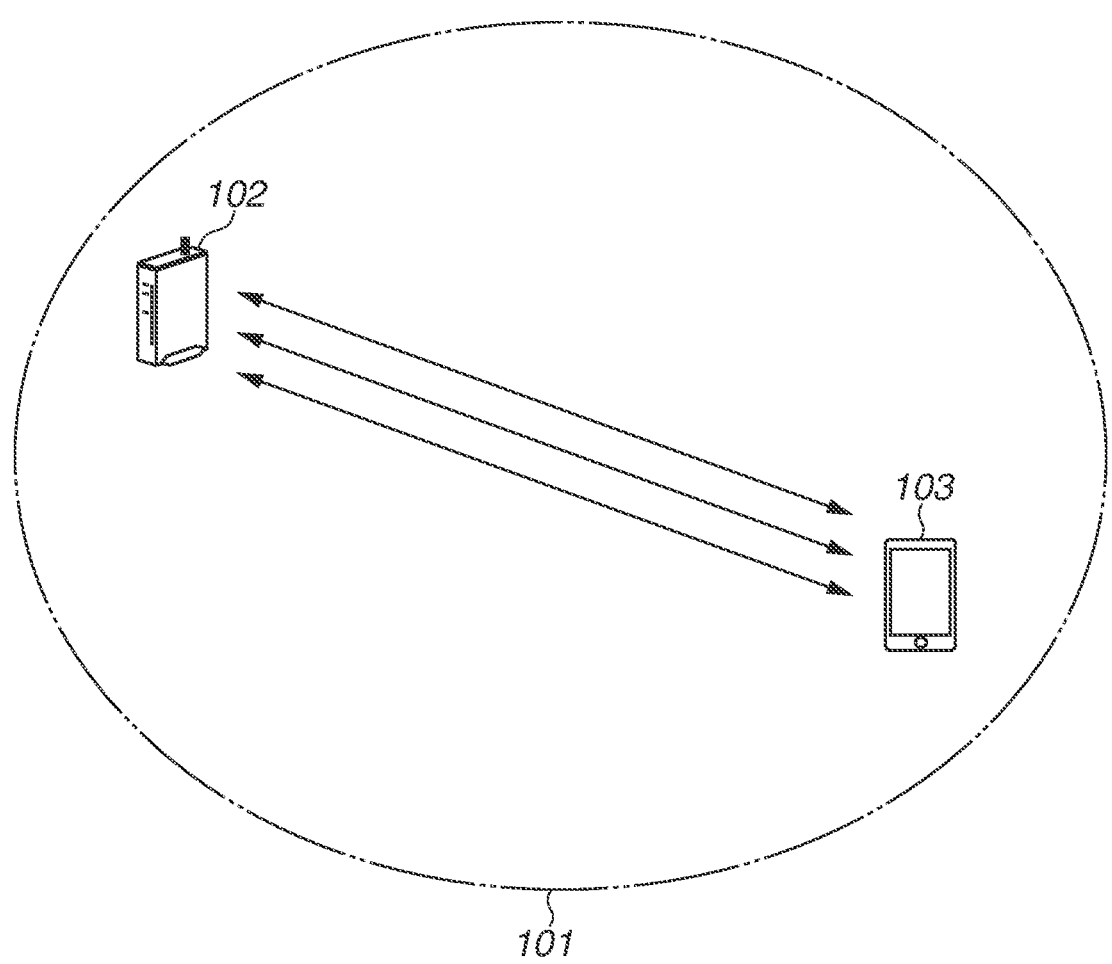
FIG. 1 is a diagram illustrating a configuration of a network in which a communication apparatus 102 participates.

Hereinafter, an exemplary embodiment of the present invention will be described in detail with reference to the attached drawings. In addition, the configurations described in the following exemplary embodiment are mere examples, and the present invention is not limited to the configurations illustrated in the drawings.

FIG. 1 illustrates a configuration of a network in which a communication apparatus 102 according to the present exemplary embodiment participates. The communication apparatus 102 is an access point (AP) having a role of constructing a network 101. In addition, the network 101 is a wireless network. In the present exemplary embodiment, in a case where the communication apparatus 102 constructs a plurality of networks, basic service set identifiers (BSSIDs) of the respective networks are all the same. The BSSID stands for a basic service set identifier, and is an identifier for identifying a network. In addition, the communication apparatus 102 indicates a common service set identifier (SSID) shared among all the networks. The SSID stands for a service set identifier, and is an identifier for identifying an AP. In the present exemplary embodiment, the communication apparatus 102 uses one SSID even in a case where the communication apparatus 102 establishes a plurality of connections.

In addition, the communication apparatus 103 is a station (STA) having a role of participating in the network 101. Each communication apparatus complies with the Institute of Electrical and Electronics Engineers (IEEE) 802.11be (extremely high throughput (EHT)) standard, and can execute wireless communication complying with the IEEE 802.11be standard, via the network 101. The IEEE stands for the Institute of Electrical and Electronics Engineers. In addition, the EHT stands for extremely high throughput. The EHT may be interpreted as an abbreviation for extreme high throughput. Each communication apparatus can execute communication in frequency bands including a 2.4-gigahertz (GHz) band, a 5-GHz band, and a 6-GHz band. In addition, each communication apparatus can execute communication using bandwidths including a 20-megahertz (MHz) band, a 40-MHz band, a 80-MHz band, a 160-MHz band, and a 320-MHz band.

By executing orthogonal frequency division multiple access (OFDMA) complying with the IEEE 802.11be standard, the communication apparatuses 102 and 103 can implement multi-user (MU) communication in which signals of a plurality of users are multiplexed. The OFDMA stands for orthogonal frequency division multiple access. In the OFDMA, a part (resource unit (RU)) of divided frequency bands is allocated to each STA while avoiding redundancy, and carriers allocated to the respective STAs are orthogonal to each other. The AP can therefore concurrently communicate with a plurality of STAs.

In addition, the communication apparatuses 102 and 103 can execute multi-band communication of performing communication by establishing connections via a plurality of frequency channels. For example, with the communication apparatus 103, the communication apparatus 102 can establish a connection via a first frequency channel in the 2.4-GHz band and a connection via a second frequency channel in the 5-GHz band, and communicate with the communication apparatus 103 via both of the connections. In this case, the communication apparatus 102 maintains the connection via the second frequency channel concurrently with the connection via the first frequency channel. In this manner, the communication apparatus 102 can increase throughput in communication with the communication apparatus 103 by establishing connections with the communication apparatus 103 via a plurality of frequency channels. In a case where the communication apparatus 102 and the communication apparatus 103 establish a plurality of connections with a counterpart apparatus, the communication apparatus 102 and the communication apparatus 103 can simultaneously perform communication in the connections. In addition, the multi-band communication may be called "multi-link communication". In addition, a connection to be established may be called a "link". In addition, a plurality of connections via different frequency channels in the same frequency band may be established instead of connections in different frequency bands.

In the multi-band communication, the communication apparatuses 102 and 103 establish connections via a plurality of frequency channels in different frequency bands. In this case, by transmitting and receiving signals via one connection, a connection via a different frequency channel can be controlled. In addition, the communication apparatuses 102 and 103 may establish connections via different frequency channels in the same frequency band. In this case, the frequency channels need not be adjacent to each other. Specifically, the communication apparatuses 102 and 103 establish connections in two frequency channels distant by a frequency more than 20 MHz. For example, in a case where the communication apparatuses 102 and 103 establish two connections in the 5-GHz band, one connection is established in a 36 channel (ch) and the other connection is established in a 52 ch.

FIG. 1 illustrates an example in which the communication apparatus 102 establishes connections with the communication apparatus 103 via three different frequency channels. In this case, the connections are established via frequency channels in different frequency bands including the 2.4-GHz band, the 5-GHz band, and the 6-GHz band. Specifically, for example, the communication apparatus 102 establishes connections with the communication apparatus 103 via a first frequency channel in the 2.4-GHz band, a second frequency channel in the 5-GHz band, and a third frequency channel in the 6-GHz band. By establishing a plurality of connections with the communication apparatus 103 in different frequency bands, even in a case where a certain band is busy, the communication apparatus 102 can communicate with the communication apparatus 103 in the other bands. This can prevent a decline in throughput in the communication with the communication apparatus 103.

In the present exemplary embodiment, connections are established in different frequency bands, but a connection configuration is not limited to this. The communication apparatus 102 is only required to establish connections with the communication apparatus 103 via different frequency channels. The communication apparatus 102 may establish connections with the communication apparatus 103 via a plurality of different frequency channels in the same frequency band. In this case, connections in different frequency bands may also be established. For example, the communication apparatus 102 may establish connections with the communication apparatus 103 via a first frequency channel in the 2.4-GHz band and a second frequency channel in the 2.4-GHz band. In addition to this, the communication apparatus 102 may establish a connection with the communication apparatus 103 via a third frequency channel in the 5-GHz band. Because the communication apparatus 102 can communicate data via a plurality of connections by establishing the plurality of connections with the communication apparatus 103 in different frequency channels, a time taken for data communication can be reduced as compared with a case where one connection is established. In addition, when the communication apparatus 102 communicates data with the communication apparatus 103, by establishing a plurality of connections with the communication apparatus 103 in different frequency channels, the communication apparatus 102 can also simultaneously perform communication of backup. For example, the communication apparatus 102 can simultaneously transmit data that is the same as data to be transmitted to the communication apparatus 103 via a certain frequency channel, to the communication apparatus 103 via a different frequency channel. With this configuration, even in a case where the communication apparatus 103 fails to receive data in communication via one frequency channel, the communication apparatus 103 can receive data in communication via the other frequency channel. In this manner, by simultaneously transmitting the same data via different frequency channels as simultaneous communication of backup, even in a case where a failure or an error of some sort occurs in communication via one frequency channel, data can be communicated via another frequency channel.

In the present exemplary embodiment, in a case where the communication apparatus 102 establishes a plurality of connections with the communication apparatus 103, the communication apparatus 102 controls a connection with the communication apparatus 103 in a second frequency channel by transmitting a signal via a first frequency channel. For example, by transmitting a signal for requesting disconnection of a connection, to the communication apparatus 103 via the first frequency channel, the communication apparatus 102 disconnects the connection with the communication apparatus 103 in the second frequency channel. Alternatively, for example, by performing association with the communication apparatus 103 via the first frequency channel, the communication apparatus 102 establishes a connection with the communication apparatus 103 in the second frequency channel.

Specifically, the signal transmitted in the first frequency channel is a management frame complying with the IEEE 802.11be standard. The management frame specifically refers to a Beacon frame, a Probe Request frame/Response frame, or an Association Request frame/Response frame. In addition to these frames, a Disassociation frame, an Authentication frame, a Deauthentication frame, and an Action frame are also called management frames. The Beacon frame is a frame for reporting information regarding a network. In addition, the Probe Request frame is a frame for requesting network information. The Probe Response frame is a response to the Probe Request frame, and is a frame for providing network information. The Association Request frame is a frame for requesting connection. The Association Response frame is a response to the Association Request frame, and is a frame indicating a connection permission or error. The Disassociation frame is a frame for disconnecting connection. The Authentication frame is a frame for authenticating a counterpart apparatus, and the Deauthentication frame is a frame for stopping authentication of a counterpart apparatus and disconnecting connection. The Action frame is a frame for performing an additional function other than the above-described functions.

In addition, the communication apparatuses 102 and 103 comply with the IEEE 802.11be standard, but the communication apparatuses 102 and 103 may additionally comply with at least any one of legacy standards, which are standards formulated earlier than the IEEE 802.11be standard. The legacy standards refer to the IEEE 802.11a/b/g/n/ac/ax standards. In addition to the IEEE 802.11 series standards, the communication apparatuses 102 and 103 may comply with other communication standards such as Bluetooth (registered trademark), near field communication (NFC), an ultra wide band (UWB), ZigBee, and multi band OFDM alliance (MBOA). The UWB stands for an ultra wide band, and the MBOA stands for a multi band OFDM alliance. In addition, the OFDM stands for orthogonal frequency division multiplexing. In addition, the NFC stands for near field communication. The UWB includes a wireless universal serial bus (USB), wireless 1394, Winners Information Network (WiNET), and the like. In addition, the communication apparatuses 102 and 103 may comply with a communication standard of wired communication of a wired local area network (LAN) or the like.

Specific examples of the communication apparatus 102 include a wireless LAN router, a personal computer (PC), and the like, but the communication apparatus 102 is not limited to these. The communication apparatus 102 may be any communication apparatus as long as the communication apparatus can execute multi-band communication with a different communication apparatus. In addition, the communication apparatus 102 may be an information processing apparatus such as a wireless chip that can execute wireless communication complying with the IEEE 802.11be standard. In addition, specific examples of the communication apparatus 103 include a camera, a tablet, a smartphone, a PC, a mobile phone, a video camera, and the like, but the communication apparatus 103 is not limited to these. The communication apparatuses 103 is only required to be a communication apparatus that can execute multi-band communication with a different communication apparatus. In addition, the communication apparatus 103 may be an information processing apparatus such as a wireless chip that can execute wireless communication complying with the IEEE 802.11be standard. In addition, the network illustrated in FIG. 1 is a network including one AP and one STA, but the number of APs and the number of STAs are not limited to these. In addition, an information processing apparatus such as a wireless chip includes an antenna for transmitting a generated signal.

Figure 3:
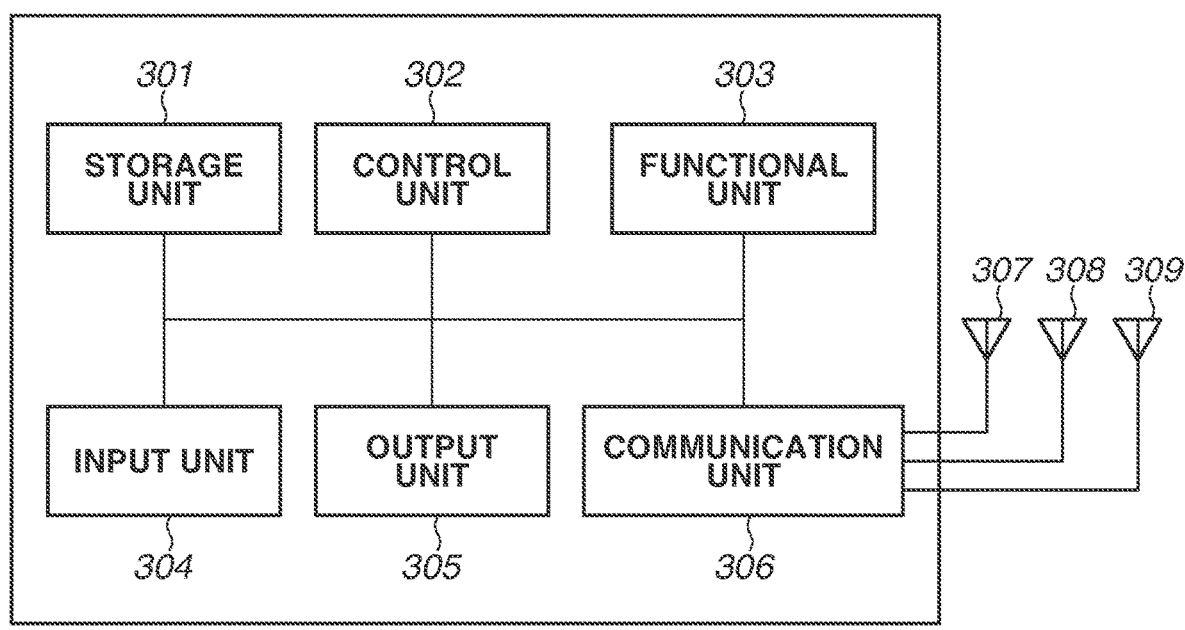
FIG. 3 is a diagram illustrating a hardware configuration of the communication apparatus 102.

FIG. 3 illustrates a hardware configuration of the communication apparatus 102 according to the present exemplary embodiment. The communication apparatus 102 includes a storage unit 301, a control unit 302, a functional unit 303, an input unit 304, an output unit 305, a communication unit 306, and antennas 307 to 309.

The storage unit 301 includes one or more memories such as a read only memory (ROM) and a random access memory (RAM), and stores computer programs for performing various operations to be described below, and various types of information such as communication parameters for wireless communication. The ROM stands for a read only memory and the RAM stands for a random access memory. Aside from memories such as a ROM and a RAM, a storage medium such as a flexible disk, a hard disk, an optical disk, a magnet-optical disk, a compact disk read only memory (CD-ROM), a CD recordable (CD-R), a magnetic tape, a nonvolatile memory card, or a digital versatile disk (DVD) may be used as the storage unit 301. In addition, the storage unit 301 may include a plurality of memories and the like.

The control unit 302 includes one or more processors such as a central processing unit (CPU) and a micro processing unit (MPU), for example. By executing computer programs stored in the storage unit 301, the control unit 302 controls the entire communication apparatus 102. In addition, the control unit 302 may control the entire communication apparatus 102 in cooperation with computer programs stored in the storage unit 301, and an operating system (OS). In addition, the control unit 302 generates data and signals to be transmitted in the communication with a different communication apparatus. The CPU stands for a central processing unit and the MPU stands a micro processing unit. In addition, the control unit 302 may include a plurality of processors such as multi-core processors, and control the entire communication apparatus 102 using the plurality of processors.

In addition, the control unit 302 executes predetermined processing such as wireless communication, image capturing, printing, and projection by controlling the functional unit 303. The functional unit 303 is hardware for the communication apparatus 102 executing predetermined processing.

The input unit 304 receives various operations from the user. The output unit 305 performs various outputs to the user via a monitor screen and a speaker. The output performed by the output unit 305 may be display on the monitor screen, a voice output by the speaker, vibration output, or the like. In addition, both the input unit 304 and the output unit 305 may be implemented by one module like a touch panel. In addition, the input unit 304 and the output unit 305 may be each formed integrally with the communication apparatus 102, or may be each formed separately from the communication apparatus 102.

The communication unit 306 controls wireless communication complying with the IEEE 802.11be standard. In addition, the communication unit 306 may control wireless communication complying with other IEEE 802.11 series standards in addition to the IEEE 802.11be standard, and may control wired communication of a wired LAN or the like. The communication unit 306 controls the antenna 307 to 309, and transmits and receives signals for wireless communication that have been generated by the control unit 302. In a case where the communication apparatus 102 complies with an NFC standard, a Bluetooth standard, and the like in addition to the IEEE 802.11be standard, the communication unit 306 may control wireless communication complying with these communication standards. In addition, in a case where the communication apparatus 102 can execute wireless communication complying with a plurality of communication standards, communication units and antennas that correspond to the respective communication standards may be individually included. Via the communication unit 306, the communication apparatus 102 communicates data such as image data, document data, and video data with the communication apparatus 103. In addition, at least one of the antennas 307 to 309 may be formed separately from the communication unit 306, or may be formed as one module together with the communication unit 306.

The antennas 307 to 309 are antennas that can execute communication in the 2.4-GHz band, the 5-GHz band, and the 6-GHz band, respectively. In the present exemplary embodiment, the communication apparatus 102 include different antennas for the respective frequency bands, but communication in each frequency band may be implemented by one or two antennas. Alternatively, the communication apparatus 102 may include four or more antennas. In addition, the communication apparatus 102 may include communication units 306 corresponding to the respective antennas 307 to 309.

In addition, the communication apparatus 103 has a similar hardware configuration to the communication apparatus 102.

Figure 2:
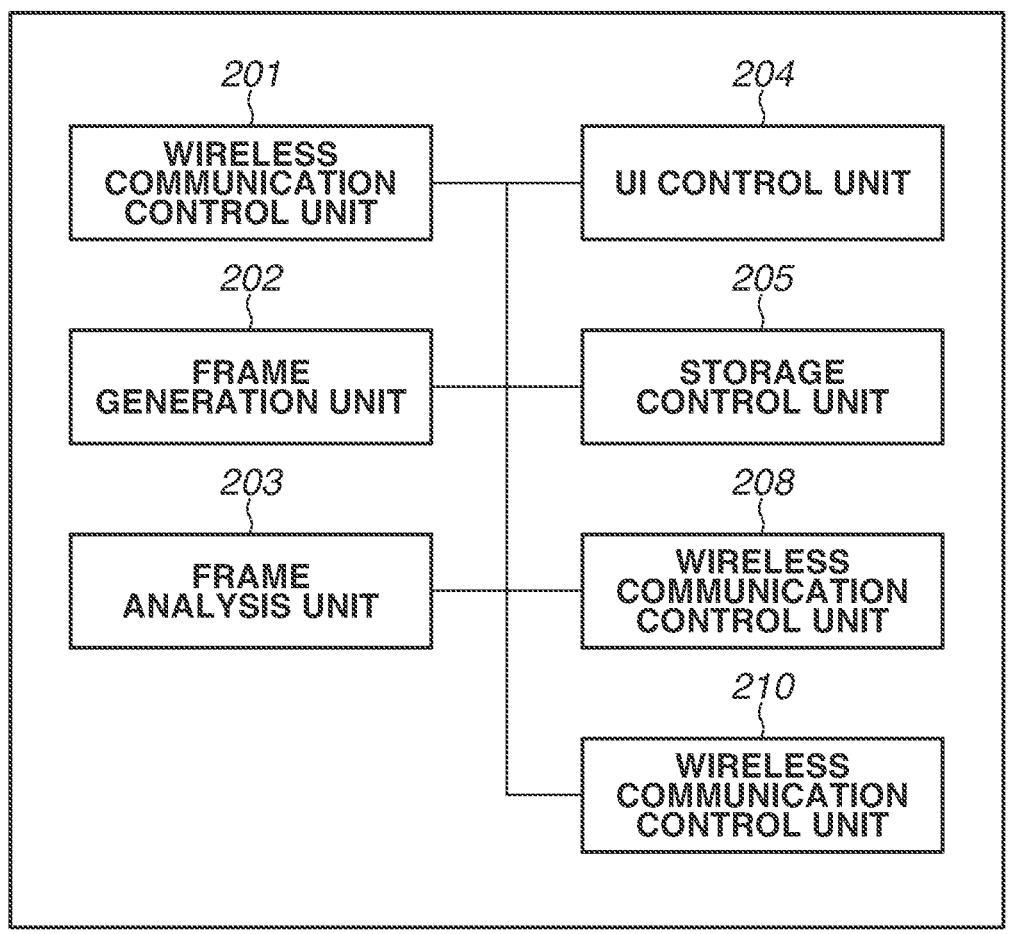
FIG. 2 is a diagram illustrating a functional configuration of the communication apparatus 102.

FIG. 2 illustrates a functional configuration of the communication apparatus 102 according to the present exemplary embodiment. The communication apparatus 102 includes wireless communication control units 201, 208, and 210, a frame generation unit 202, a frame analysis unit 203, a user interface (UI) control unit 204, and a storage control unit 205.

The wireless communication control units 201, 208, and 210 each include a circuit for transmitting and receiving a wireless signal to and from a different communication apparatus, and a program for controlling the circuit. The wireless communication control units 201, 208, and 210 control wireless communication based on a frame generated by the frame generation unit 202 to be described below, in accordance with the IEEE 802.11 series standard. The wireless communication control units 201, 208, and 210 control the transmission and reception of wireless signals with a different communication apparatus in the 2.4-GHz band, the 5-GHz band, and the 6-GHz band, respectively. In the present exemplary embodiment, the communication apparatus 102 includes three wireless communication control units, but the number of wireless communication control units is not limited to this, and may be two or less or four or more.

The frame generation unit 202 generates a wireless control frame to be transmitted by at least one of the wireless communication control units 201, 208, and 210. The wireless control frame generated by the frame generation unit 202 may be generated based on a stetting stored in the storage unit 301. In addition to or instead of this, the wireless control frame may also be generated based on a user stetting input by the user.

The frame analysis unit 203 interprets wireless control frames received by the wireless communication control units 201, 208, and 210, and reflects content of the received wireless control frames in at least one of the wireless communication control units 201, 208, and 210. For example, in a case where a wireless control frame received via the wireless communication control unit 201 indicates disconnection of a connection in the 5-GHz band, the wireless communication control unit 208 stops transmission and reception of wireless signals. By the frame analysis unit 203 analyzing a wireless control frame received by whichever wireless communication control unit, a wireless communication control unit that has not received the wireless control frame can be controlled.

The UI control unit 204 includes a program for controlling at least one of the input unit 304 and the output unit 305 of the communication apparatus 102. The UI control unit 204 has a function for presenting information regarding the communication apparatus 102, to the user, such as the display of an image or voice output that is performed via the output unit 305, for example.

The storage control unit 205 controls data writing or readout into or from the storage unit 301 storing data and programs operating in the communication apparatus 102.

Figure 4:
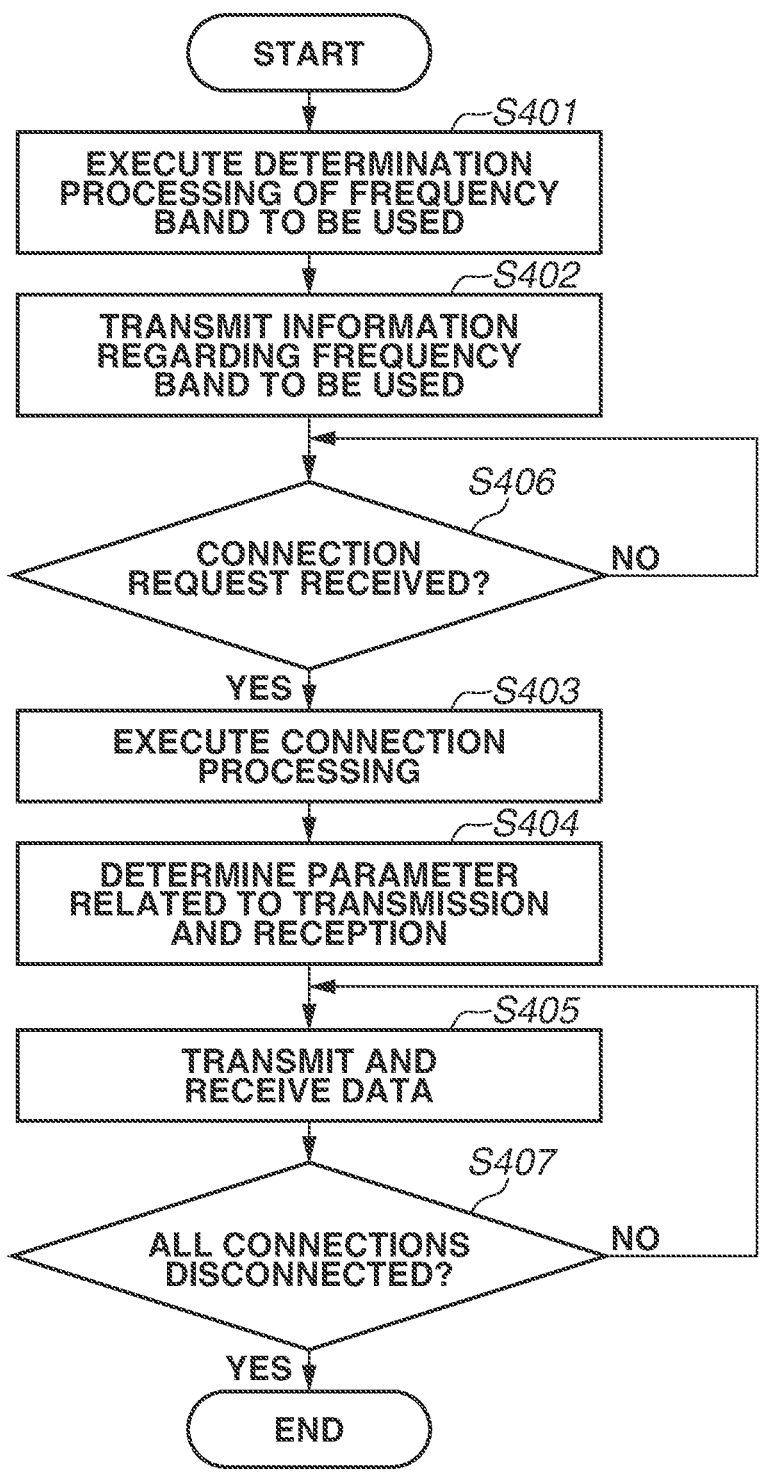
FIG. 4 is a flowchart illustrating processing to be executed when the communication apparatus 102 performs multi-band communication.

FIG. 4 is a flowchart illustrating processing to be executed by loading a computer program stored in the storage unit 301, onto the control unit 302, and executing the computer program, in a case where the communication apparatus 102 performs multi-band communication.

In the present exemplary embodiment, the communication apparatus 102 and the communication apparatus 103 each have capability to establish connections in the 2.4-GHz band, the 5-GHz band, and the 6-GHz band. In addition, as illustrated in a sequence diagram in FIG. 5, the description will be given of an example case where the communication apparatus 102 establishes connections with the communication apparatus 103 in the respective frequency bands corresponding to the 2.4-GHz band, the 5-GHz band, and the 6-GHz band.

The communication apparatus 102 starts processing of this flow based on power activation of the communication apparatus 102. Alternatively, the communication apparatus 102 may start the processing of this flow each time a predetermined time elapses from power activation of the communication apparatus 102 or establishment of connection with a STA. Alternatively, the communication apparatus 102 may start the processing of this flow based on an instruction to establish connection with a STA that is issued by the user. Alternatively, the communication apparatus 102 may start the processing of this flow based on the press of a button included in the communication apparatus 102 for issuing an instruction to shift to a state of receiving a connection request from a STA. Specifically, the button for issuing an instruction to receive a connection request from a STA is a button supporting a button pressing method complying with a Wi-Fi Protected Setup (WPS) standard. Alternatively, the communication apparatus 102 may start the processing of this flow based on an instruction from an application operating in the communication apparatus 102.

First of all, in steps S401 and S5001, the communication apparatus 102 determines a frequency band to be used by the communication apparatus 102 for multi-band communication. The communication apparatus 102 determines a frequency band to be used by the communication apparatus 102 for multi-band communication, depending on a congestion situation of a surrounding wireless environment. Specifically, the communication apparatus 102 counts up the number of Probe Requests received in each of the frequency bands corresponding to the 2.4-GHz band, the 5-GHz band, and the 6-GHz band. In a case where the number of Probe Requests received in a certain frequency band is equal to or smaller than a predetermined threshold value, the communication apparatus 102 determines to use the frequency band for multi-band communication. Alternatively, the communication apparatus 102 may wait for the reception of Beacons in each frequency band for a predetermined time, and count up the number of received Beacons. In this case, in a case where the number of Beacons received in a certain frequency band is equal to or smaller than a predetermined threshold value, the communication apparatus 102 may determine to use the frequency band for multi-band communication. Alternatively, the communication apparatus 102 may perform carrier sense for a predetermined time, and count up the number of times data transmission by a different communication apparatus is detected. In this case, in a case where carrier sense is performed in a certain frequency band for a predetermined time, and the number of times data transmission by a different communication apparatus is detected within the time is equal to or smaller than a predetermined threshold value, the communication apparatus 102 may determine to use the frequency band for multi-band communication. In addition, in this case, the communication apparatus 102 may detect a time for which data transmission has been performed by a different communication apparatus, instead of the number of times data transmission is detected. In a case where the communication apparatus 102 calculates a percentage of a time for which data transmission has been performed, with respect to a time for which carrier sense has been performed in a certain frequency band, and the percentage is equal to or smaller than a predetermined threshold value, the communication apparatus 102 may determine to use the frequency band for multi-band communication. Alternatively, in a case where the communication apparatus 102 has established connection with a different AP other than the communication apparatus 102 via a cable or wirelessly, before performing the processing of this step, the communication apparatus 102 may acquire information regarding a frequency band to be used for multi-band communication, from the different AP.

The communication apparatus 102 may perform the determination in this step by combining these determination methods. In the case of combining a plurality of determination methods, in a case where it is determined that a frequency band for which measurement has been performed by all the determination methods is to be used for multi-band communication, the communication apparatus 102 determines to use the frequency band for multi-band communication. Alternatively, in a case where it is determined that a frequency band for which measurement has been performed by at least one determination method is to be used for multi-band communication, the communication apparatus 102 may determine to use the frequency band for multi-band communication.

In addition, in a case where a congestion situation in each frequency band is measured, the communication apparatus 102 may perform measurement only for a predetermined frequency channel (hereinafter, channel) in each frequency band, or may perform measurement for a plurality of channels. In addition, in a case where measurement is performed for a plurality of channels, in a case where at least one channel in a certain frequency band is determined to be used for multi-band communication, the communication apparatus 102 determines to use the frequency band for multi-band communication. Alternatively, in a case where at least half channels or more of a plurality of channels measured in a certain frequency band are determined to be used for multi-band communication, the communication apparatus 102 may determine to use the frequency band for multi-band communication. In addition, in a case where measurement is performed for a plurality of channels in a certain frequency band, the communication apparatus 102 may use channels not adjacent to each other.

Figure 5:
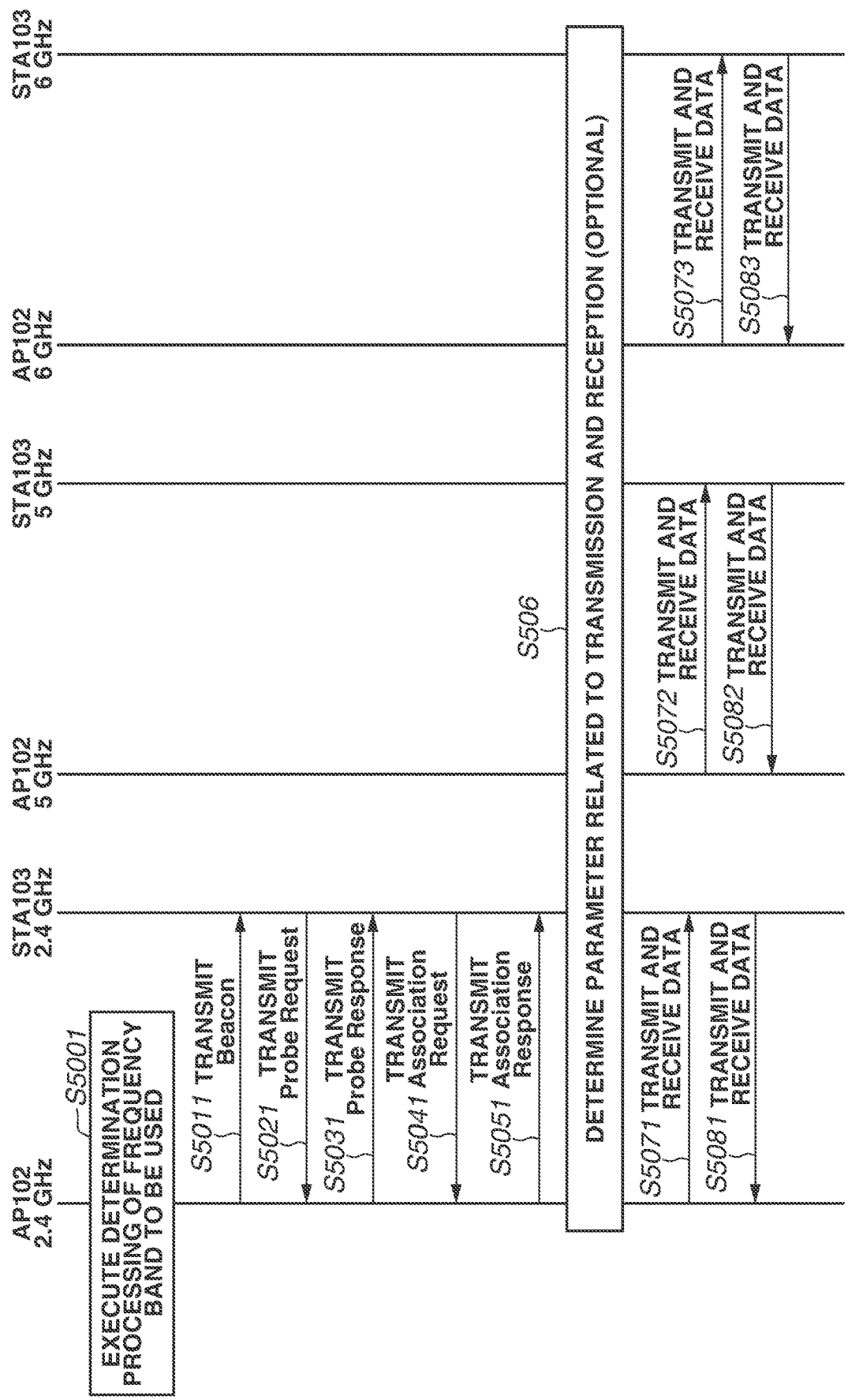
FIG. 5 is a sequence diagram illustrating processing to be executed when the communication apparatus 102 performs multi-band communication with a communication apparatus 103.

In the sequence illustrated in FIG. 5, the communication apparatus 102 determines that three frequency bands corresponding to the 2.4-GHz band, the 5-GHz band, and the 6-GHz band are usable.

If the communication apparatus 102 determines a usable frequency band, in steps S402 and S5011, the communication apparatus 102 transmits information regarding the frequency band. In the present exemplary embodiment, the communication apparatus 102 notifies information regarding a frequency band to be used for multi-band communication, using a Beacon. Specifically, by transmitting a Beacon frame including a Multi-band element illustrated in FIG. 6, in at least one of frequency bands to be used for multi-band communication, the communication apparatus 102 notifies a frequency band to be used for multi-band communication. In the present exemplary embodiment, the communication apparatus 102 transmits a Beacon frame in the 2.4-GHz band among frequency bands to be used for multi-band communication. In addition, a Beacon Interval being an interval at which a Beacon is transmitted is 100 milliseconds, but the Beacon Interval is not limited to this.

In addition, a Beacon transmitted in this step includes information regarding all frequency channels determined to be Yes in step S401, as information regarding frequency bands to be used for multi-band communication. Alternatively, information included in the Beacon is not limited to this, and the Beacon may include only information regarding a part of the frequency channels.

In addition, information regarding a frequency band to be used for multi-band communication that is included in a Beacon includes information regarding a frequency band to be used for multi-band communication that is other than a frequency band in which the Beacon is transmitted. For example, in a case where a Beacon is transmitted only in the 2.4-GHz band, the Beacon includes, as information regarding a frequency band to be used for multi-band communication, not only information regarding the 2.4-GHz band but also information regarding the 5-GHz band and the 6-GHz band. Alternatively, the communication apparatus 102 may include information regarding a frequency band to be used for multi-band communication that is other than a frequency band in which a Beacon is transmitted, in the Beacon. For example, in a case where a Beacon is transmitted in the 2.4-GHz band, the Beacon may include only information regarding the 5-GHz band and the 6-GHz band as information regarding a frequency band to be used for multi-band communication.

Figure 6:
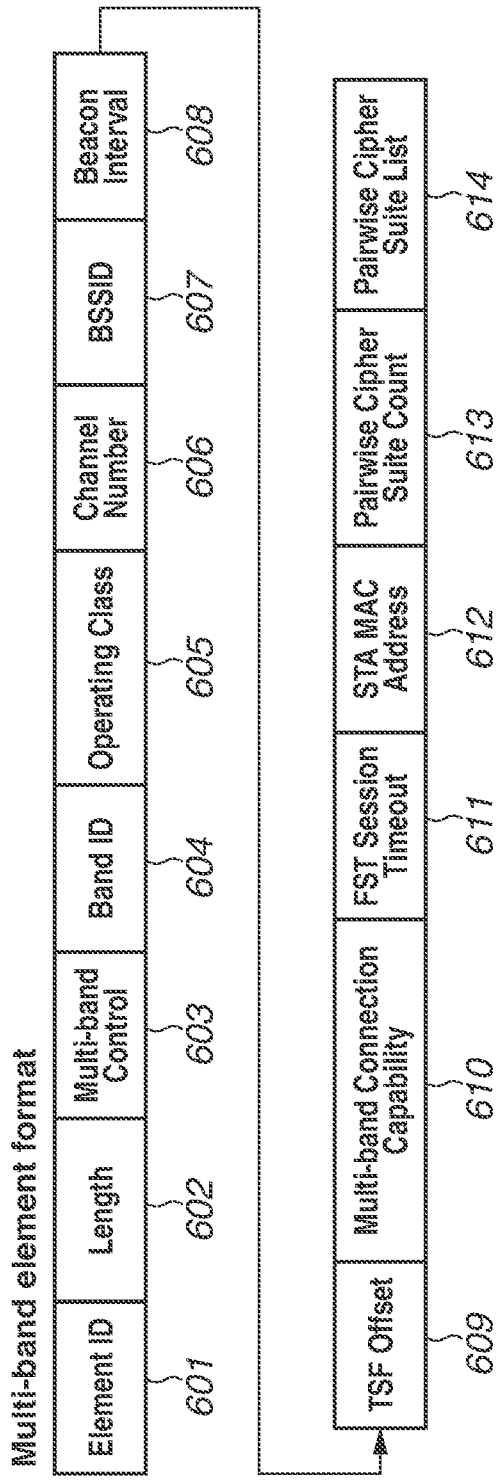
FIG. 6 is a diagram illustrating an example of a frame format of a Multi-band element to be communicated by the communication apparatus 102.

FIG. 6 illustrates an example of a frame format of a Multi-band element to be communicated by the communication apparatus 102.

The Multi-band element includes fields of an Element ID 601, a Length 602, a Multi-band Control 603, a Band ID 604, and an Operating Class 605. The Multi-band element further includes fields of a Channel Number 606, a BSSID 607, a Beacon Interval 608, and a timing synchronization function (TSF) Offset 609. The Multi-band element further includes fields of a Multi-band Connection Capability 610, a fast session transfer (FST) Session Timeout 611, and a STA media access control (MAC) Address 612. The Multi-band element further includes fields of a Pairwise Cipher Suite Count 613 and a Pairwise Cipher Suite List 614. These fields are transmitted by the communication apparatus 102 and received by a different communication apparatus, in an order starting from the Element ID 601 that is illustrated in FIG. 6. The communication apparatus 102 may transmit the fields of the Multi-band element to a different communication apparatus after generating all the fields, or may perform generation and transmission for each field in order from the Element ID 601.

In addition, an order in which the fields are transmitted and received is not limited to the order illustrated in FIG. 6, and the order of the fields may be different. In addition, any of the fields may be omitted, or a field not illustrated in FIG. 6 may be added to a position between arbitrary fields.

Each field of the Multi-band element illustrated in FIG. 6 will be described.

The Element ID 601 includes an identifier for identifying an element. In the present exemplary embodiment, a value "158" is included as an identifier indicating that the element is the Multi-band element.

The Length 602 includes information indicating a length of the Multi-band element that excludes the Element ID 601 and the Length 602.

The Multi-band Control 603 includes information such as a STA Role, a STA MAC Address Present, and a Pairwise Cipher Suite Present. The STA Role includes information indicating a role of a transmission apparatus (the communication apparatus 102 in this example) of the Multi-band element in a frequency band indicated in the Multi-band element. Specifically, the information indicating a role is information indicating whether the transmission apparatus is an AP or a STA in a frequency band indicated in the Multi-band element. Because the communication apparatus 102 is an AP, in the present exemplary embodiment, information indicating an AP is included. In addition, the STA MAC Address Present is information indicating whether the STA MAC Address 612 to be described below is included in the Multi-band element. Because the STA MAC Address 612 is an optional field, while the STA MAC Address 612 is included in the Multi-band element in some cases, the STA MAC Address 612 is not included in the Multi-band element in the other cases. The Pairwise Cipher Suite Present is information indicating whether the Pairwise Cipher Suite Count 613 and the Pairwise Cipher Suite List 614 are included in the element. Because both of the Pairwise Cipher Suite Count 613 and the Pairwise Cipher Suite List 614 are optional fields, while the Pairwise Cipher Suite Count 613 and the Pairwise Cipher Suite List 614 are included in the Multi-band element in some cases, the Pairwise Cipher Suite Count 613 and the Pairwise Cipher Suite List 614 are not included in the Multi-band element in the other cases.

The Band ID 604 includes information for identifying a frequency band related to the Operating Class 605 and the Channel Number 606, which will be described below. In the present exemplary embodiment, the Band ID 604 includes information indicating a frequency band determined by the communication apparatus 102 in step S401 to be a frequency band to be used for multi-band communication. FIG. 7 illustrates an example of a correspondence relationship between a value included in the Band ID 604, and information indicated by the value. In the present exemplary embodiment, because the communication apparatus 102 determines, in step S401 (S5001), the 2.4-GHz band, the 5-GHz band, and the 6-GHz band as frequency bands to be used for multi-band communication, the communication apparatus 102 transmits a Multi-band element including a Band ID=11. Alternatively, the communication apparatus 102 may include a Band ID=10 indicating that the 5-GHz band and the 6-GHz band are to be used for multi-band communication, in a Multi-band element to be included in a Beacon to be transmitted in the 2.4-GHz band. Similarly, in a case where the communication apparatus 102 transmits Beacons in the 5-GHz band and the 6-GHz band, the communication apparatus 102 may include Band IDs=8 and 9 in the respective Multi-band elements. In addition, a correspondence relationship between a value in a Band ID, and information indicated by each value is not limited to that illustrated in FIG. 7.

In the present exemplary embodiment, one Band ID indicates a plurality of frequency bands, but the configuration of the Band ID is not limited to this, and one Band ID may indicate only one frequency band. In this case, a Beacon indicating that the communication apparatus 102 can use a plurality of frequency bands may include a plurality of Multi-band elements. For example, a case where the communication apparatus 102 transmits a Beacon indicating that the 2.4-GHz band and the 5-GHz band are to be used for multi-band communication will be considered. In this case, the Beacon includes both of a Multi-band element including a Band ID=2 and a Multi-band element including a Band ID=4. In addition, also in a case where a Multi-band element is included for each frequency band to be used for multi-band communication, a Multi-band element corresponding to a frequency band in which a Beacon is transmitted may be included in the Beacon, or the Multi-band element may be omitted in the Beacon.

The Operating Class 605 is information indicating a set of channels to be used for multi-band communication that are included in the frequency bands indicated by the Band ID 604. Specifically, the information indicating a set of channels is information indicating one or more frequency channels to be used for multi-band communication. The Operating Class 605 indicates at least one channel to be used by the communication apparatus 102 for multi-band communication that is included in the frequency bands indicated by the Band ID 604. Specifically, the Operating Class 605 includes a value indicating a combination of a start frequency of a channel to be used for multi-band communication, an interval between channels, and a set of channels. The start frequency of a channel is a value to be used for calculating a central frequency of the channel. In addition, the interval between channels is a value indicating an interval between central frequencies of adjacent and non-overlapping channels. The set of channels is information indicating at least one channel to be used for multi-band communication. In addition, in a case where all channels in the frequency bands indicated by the Band ID 604 are used, 0 is included as a value indicating that all channels are to be used.

The Channel Number 606 is information indicating a channel to be used for multi-band communication. Specifically, the Channel Number 606 is information indicating one or more channels to be used for multi-band communication, among the set of channels indicated by the Operating Class 605. In addition, a channel that has been used for measurement of a congestion situation when a frequency band to be used for multi-band communication is determined in step S401 may be included as information regarding a channel that is included as the Channel Number 606. In addition, in this case, in a case where measurement of a congestion situation has been performed in a plurality of channels in step S401, a channel determined to be not used for multi-band communication may be excluded from channels designated as the Channel Number 606. Alternatively, the Channel Number 606 may include a channel designated by the user, or may include a channel preset in the communication apparatus 102.

In addition, in a case where a plurality of frequency bands is designated in the Band ID 604, one Operating Class 605 indicates a combination of a start frequency of a channel to be used, an interval between channels, and a set of channels, for each of the plurality of frequency bands. For example, a case where the Band ID 604 includes information indicating the 2.4-GHz band, the 5-GHz band, and the 6-GHz band will be considered. In this case, one value corresponding to a start frequency of a channel to be used for multi-band communication, an interval between channels, and a set of channels in each band of the 2.4-GHz band, the 5-GHz band, and the 6-GHz band is included as the Operating Class 605. In this case, the Channel Number 606 includes a plurality of pieces of information regarding a channel to be used. Specifically, information regarding at least one channel to be used in each band of the 2.4-GHz band, the 5-GHz band, and the 6-GHz band is included as the Channel Number 606.

Alternatively, in a case where a plurality of frequency bands is designated in the Band ID 604, the Operating Class 605 may include a plurality of Operating Classes as information corresponding to the plurality of frequency bands. For example, in a case where the 2.4-GHz band, the 5-GHz band, and the 6-GHz band are designated in the Band ID 604, in addition to an Operating Class corresponding to the 2.4-GHz band, Respective operating Classes corresponding to the 5-GHz band and the 6-GHz band may be included. In this case, the Operating Class 605 includes a plurality of values. Operating Classes correspond to lower frequency bands in order from the Operating Class included at the top. For example, in a case where Operating Classes=81, 115, and 131 are included, the Operating Class=81 is an Operating Class corresponding to the 2.4-GHz band. Similarly, the Operating Class=115 is an Operating Class corresponding to the 5-GHz band, and the Operating Class=131 is an Operating Class corresponding to the 6-GHz band. Alternatively, a frequency band to which an included Operating Class corresponds may be determined from at least one of a start frequency of a channel, an interval between channels, and a set of channels that are indicated by the Operating Class. Also in this case, information regarding at least one channel to be used for multi-band communication in each band of the 2.4-GHz band, the 5-GHz band, and the 6-GHz band is included as the Channel Number 606.

Alternatively, in a case where a plurality of Multi-band elements is included for indicating a plurality of frequency bands, an Operating Class corresponding to the Band ID 604 included in the same Multi-band element is included. In this case, the Channel Number 606 includes information regarding at least one channel to be used for multi-band communication in a frequency band indicated by the Band ID 604. In a case where a plurality of channels can be used in the same frequency band, the Channel Number 606 includes information regarding a plurality of channels.

Alternatively, the communication apparatus 102 may set a Multi-band element for each channel to be used for multi-band communication. In this case, a Beacon includes the same number of Multi-band elements as the number of channels to be used by the communication apparatus 102 for multi-band communication, and includes a plurality of Multi-band elements including the same Band ID 604.

The BSSID 607 stands for a basic service set identifier, and is information indicating an identifier of a network constructed by a transmission apparatus (the communication apparatus 102 in this example) of the Multi-band element. Specifically, the BSSID 607 indicates an identifier of a network constructed by a transmission apparatus of the Multi-band element in a channel indicated by the Band ID 604 and the Channel Number 606. In the present exemplary embodiment, all of BSSIDs of networks constructed by the communication apparatus 102 are the same. In a case where the communication apparatus 102 indicates a plurality of usable channels (Channel Numbers 606) using one Multi-band element, the BSSID 607 includes BSSIDs of a plurality of networks. In addition, in a case where the communication apparatus 102 indicates one channel (Channel Number 606) to be used for multi-band communication, using one Multi-band element, the BSSID 607 includes a BSSID of one network. In addition, in a case where the communication apparatus 102 constructs a plurality of networks in one channel, the BSSID 607 may include BSSIDs of a plurality of networks. In addition, in a case where the communication apparatus 102 has not constructed a network yet in a channel indicated by the Band ID 604 and the Channel Number 606, the BSSID 607 includes 0, or the BSSID 607 is omitted. Alternatively, the BSSID 607 may include 1 as many times as the number of bits allocated to the BSSID 607, in such a manner as to indicate a wild card BSSID.

The Beacon Interval 608 includes information indicating a transmission interval of a Beacon to be transmitted in a channel indicated by the Band ID 604 and the Channel Number 606. Specifically, the Beacon Interval 608 indicates a transmission interval of a Beacon to be transmitted in the network by a transmission apparatus (the communication apparatus 102 in this example) of the Multi-band element. In addition, in a case where a network has not been constructed in the channel indicated by the Band ID 604 and the Channel Number 606, the Beacon Interval 608 includes 0. In addition, in a case where the communication apparatus 102 indicates a plurality of channels to be used for multi-band communication, using one Multi-band element, the Beacon Interval 608 includes a plurality of Beacon Intervals corresponding to the respective channels. On the other hand, in a case where the communication apparatus 102 indicates one channel to be used for multi-band communication, using one Multi-band element, the Beacon Interval 608 includes one Beacon Interval corresponding to the channel. In addition, in a case where the communication apparatus 102 constructs a plurality of networks in one channel, the Beacon Interval 608 may include Beacon Intervals corresponding to the plurality of respective networks.

The TSF Offset 609 includes information indicating an offset value between a TSF of a network in which the communication apparatus 102 transmits an element, and a TSF of a network constructed in a channel indicated by the Channel Number 606. The TSF stands for a timing synchronization function, and is a value to be used for synchronizing an AP and a STA participating in a network. In addition, in a case where a network has not been constructed in a channel indicated by the Channel Number 606, the TSF Offset 609 includes 0. In addition, in a case where the communication apparatus 102 indicates a plurality of channels (Channel Numbers 606) to be used for multi-band communication, using the one element, the TSF Offset 609 includes a plurality of TSF Offsets corresponding to the respective channels. On the other hand, in a case where the communication apparatus 102 indicates one channel (Channel Number 606) to be used for multi-band communication, using the one element, the TSF Offset 609 includes one TSF Offset corresponding to the channel. In addition, in a case where the communication apparatus 102 constructs a plurality of networks in one channel, the TSF Offset 609 may include TSF Offsets corresponding to the plurality of respective networks.

The Multi-band Connection Capability 610 includes information indicating the capability related to the connection of the communication apparatus 102 in a channel to be used for multi-band communication that is indicated in the Multi-band element. Specifically, the Multi-band Connection Capability 610 indicates capability related to the connection of a transmission apparatus (the communication apparatus 102 in this example) of the Multi-band element in a channel indicated by the Channel Number 606. The capability related to the connection specifically refers to information indicating whether the communication apparatus 102 can operate as an AP in a channel indicated in the Multi-band element. In addition, in a case where the communication apparatus 102 indicates a plurality of channels to be used for multi-band communication, using one Multi-band element, the field includes information indicating whether the communication apparatus 102 operates as an AP in each of the channels. Alternatively, information corresponding to a plurality of channels indicated in the Multi-band element may be collectively indicated by one Multi-band Connection Capability. For example, in a case where the communication apparatus 102 operates as an AP in all the channels, the Multi-band Connection Capability 610 is only required to include one piece of information indicating that the communication apparatus 102 operates as an AP.

The FST Session Timeout 611 is information indicating a timeout value in setup processing of an FST session. The FST stands for a fast session transfer, and indicates processing of transferring an already-established session onto another channel A transfer destination channel may be a channel in the same frequency band as an original channel, or may be a channel in a different frequency band. This field may be omitted.

The STA MAC Address 612 is information indicating a media access control (MAC) address of the communication apparatus 102 in a channel designated in the Multi-band element. In addition, in a case where a STA MAC Address Present in the Multi-band Control 603 is 0 (in a case where it is indicated that this field is not included), this field is omitted. In addition, in a case where the communication apparatus 102 indicates a plurality of usable channels (Channel Numbers 606) using one Multi-band element, this field includes a plurality of MAC addresses corresponding to the respective channels. On the other hand, in a case where the communication apparatus 102 indicates one usable channel (Channel Number 606) using one Multi-band element, this field includes one MAC address corresponding to the channel. In addition, in a case where the communication apparatus 102 constructs a plurality of networks in one channel, this field may include MAC addresses corresponding to the plurality of respective networks.

The Pairwise Cipher Suite Count 613 is information indicating the number of pairwise cipher suite selectors included in the Pairwise Cipher Suite List 614 to be described below. The Pairwise Cipher Suite List 614 includes a series of selectors indicating pairwise cipher suites. Specifically, the Pairwise Cipher Suite List 614 includes information indicating usable Cipher suites in a channel designated in the Multi-band element. The Cipher suite is information indicating a combination of a key exchange algorithm, a key authentication method, a cipher, and a message authenticator. In addition, in a case where a Pairwise Cipher Suite Present in the Multi-band Control 603 is 0 (in a case where it is indicated that this field is not included), this field is omitted. In addition, in a case where the communication apparatus 102 indicates a plurality of usable channels (Channel Numbers 606) using one Multi-band element, this field includes a plurality of Cipher Suits corresponding to the respective channels. On the other hand, in a case where the communication apparatus 102 indicates one usable channel (Channel Number 606) using one Multi-band element, this field includes one Cipher Suite corresponding to the channel. In addition, in a case where the communication apparatus 102 constructs a plurality of networks in one channel, this field may include Cipher Suites corresponding to the plurality of respective networks.

As described above, by transmitting a Beacon frame including a Multi-band element as illustrated in FIG. 6, the communication apparatus 102 can transmit information regarding a frequency band to be used by the communication apparatus 102 for multi-band communication. Specifically, by transmitting a Beacon frame including a Multi-band element, the communication apparatus 102 can notify a different communication apparatus of a frequency channel to be used by the communication apparatus 102 for multi-band communication. The different communication apparatus that has received the Beacon frame can determine whether to perform multi-band communication with the communication apparatus 102, based on information regarding the frequency channel indicated by the Multi-band element.

In the present exemplary embodiment, the Multi-band element includes the Operating Class 605 and the Channel Number 606, but the format of the Multi-band element is not limited to this. The Multi-band element illustrated in FIG. 6 may include only the Channel Number 606 without including the Operating Class 605.

In the present exemplary embodiment, information regarding a frequency band to be used for multi-band communication is included in a Beacon frame, but the information may be included in a Probe Request/Response instead of or in addition to this. Alternatively, information regarding a frequency band to be used for multi-band communication may be included in an Authentication Request/Response. Alternatively, the information may be included in an Association Request/Response or a Reassociation Request/Response. In addition, in the present exemplary embodiment, an AP (the communication apparatus 102) transmits information regarding a frequency band to be used for multi-band communication, but in addition to or instead of this, a STA (the communication apparatus 103) may also determine and transmit a frequency band to be used by the STA for multi-band communication.

In addition, in the present exemplary embodiment, information regarding a frequency band to be used for multi-band communication is indicated by the Multi-band element, but the element that indicates the information is not limited to this. Information regarding a frequency band to be used for multi-band communication may be indicated by another Element including at least one piece of information included in the Multi-band element illustrated in FIG. 6.

Next, in step S5021, the communication apparatus 103 serving as a STA transmits a Probe Request based on the reception of the Beacon transmitted by the communication apparatus 102. In this case, because the Beacon is transmitted in the 2.4-GHz band, the communication apparatus 103 transmits a Probe Request to the communication apparatus 102 in the 2.4-GHz band. Because the communication apparatus 102 has received the Probe Request from the communication apparatus 103, in step S5031, the communication apparatus 102 transmits a Probe Response to the communication apparatus 103 as a response. In addition, the communication apparatus 103 can acquire information regarding a frequency band to be used by the communication apparatus 102 for multi-band communication, from the Multi-band element included in the Beacon received from the communication apparatus 102. Alternatively, instead of or in addition to this, the communication apparatus 103 may acquire information regarding a frequency band to be used by the communication apparatus 102 for multi-band communication, from the Multi-band element included in the Probe Response.

Next, the communication apparatus 102 exchanges an Authentication Request/Response not illustrated in FIG. 5, with the communication apparatus 103, and performs authentication of a counterpart apparatus. In addition, if either the communication apparatus 102 or the communication apparatus 103 transmits an Authentication Request, the other apparatus transmits an Authentication Response as a response.

In step S406, the communication apparatus 102 determines whether a connection request has been received. Specifically, the communication apparatus 102 determines whether an Association Request has been received from a different communication apparatus. In a case where the communication apparatus 102 has not received an Association Request (No in step S406), the communication apparatus 102 determines No in this step, and performs the processing in step S406 again. On the other hand, in a case where the communication apparatus 102 has received an Association Request (Yes in step S406), the communication apparatus 102 determines Yes in this step, and performs the processing in step S403.

In the present exemplary embodiment, in step S5041, the communication apparatus 103 transmits an Association Request to the communication apparatus 102, and in step S5051, the communication apparatus 102 transmits an Association Response to the communication apparatus 103 as a response thereto. In step S403, the communication apparatus 102 executes connection processing with the communication apparatus 103, and establishes a connection. In the present exemplary embodiment, a connection between the communication apparatus 102 and the communication apparatus 103 in a channel in which the Association Request/Response has been communicated is established.

In this case, the communication apparatus 103 can include, into an Association Request to be transmitted, information for requesting establishment of a connection in a frequency band different from a frequency band in which the Association Request is transmitted. The communication apparatus 103 can thereby establish a connection with the communication apparatus 102 in the different frequency band. In the present exemplary embodiment, the communication apparatus 103 includes, into an Association Request to be transmitted in the 2.4-GHz band, information for requesting establishment of connections in the 5-GHz band and the 6-GHz band. In a case where the communication apparatus 103 has received an Association Response as a response, the communication apparatus 103 can establish connections with the communication apparatus 102 in the 2.4-GHz band, the 5-GHz band, and the 6-GHz band. In addition, as information for requesting establishment of a connection in a different frequency band, an Association Request at least includes information regarding a channel in which the communication apparatus 103 desires establishment of connection. In addition to this, the Association Request may include information indicating a frequency band including the channel. In addition, in a case where a MAC address to be used by the communication apparatus 102 in the channel is identified, the Association Request may include information regarding the MAC address in addition to or instead of information regarding the channel. In addition, in addition to or instead of information regarding a different frequency band, the Association Request may include information regarding a different channel in the same frequency band. Specifically, in a case where the communication apparatus 103 desires connection with the communication apparatus 102 in a different channel included in the same frequency band as a channel in which an Association Request is transmitted, the communication apparatus 103 transmits an Association Request including information regarding the channel.

In addition, an Association Response transmitted by the communication apparatus 102 includes information indicating that connection is permitted. Alternatively, in addition to or instead of information indicating that connection is permitted, the Association Response may include information indicating a channel in which the communication apparatus 102 permits connection, among channels indicated by information included in the Association Request.

In addition, at least one of an Association Request and an Association Response may include the element as information indicating a channel in which connection is requested, or a channel in which connection is permitted. Alternatively, an element different from the Multi-band element may be included as information indicating a channel in which connection is requested, or a channel in which connection is permitted.

In addition, in a case where the communication apparatus 102 and the communication apparatus 103 establish secure connection using encryption, communication processing complying with Wi-Fi Protected Access (WPA), WPA2, or the like may be performed after step S5051. Alternatively, for performing processing complying with WPA3, the communication apparatus 102 and the communication apparatus 103 may exchange a Simultaneous Authentication of Equals (SAE) Commit and an SAE Confirm in exchanging an Authentication Request. In this case, the communication apparatus 102 and the communication apparatus 103 perform 4-way handshake after the communication of an Association Request/Response.

In the present exemplary embodiment, the communication apparatus 102 and the communication apparatus 103 establish connections in all frequency bands (the 2.4-GHz band, the 5-GHz band, and the 6-GHz band) that can be used by the communication apparatus 102, but a connection configuration is not limited to this. In a case where the communication apparatus 102 and the communication apparatus 103 perform multi-band communication, the communication apparatus 102 and the communication apparatus 103 are only required to establish connections via at least two different channels in a usable frequency band.

In the present exemplary embodiment, by the transmission and reception of an Association Request/Response in a specific channel, the communication apparatus 102 and the communication apparatus 103 establish connection in a different channel, but a connection configuration is not limited to this. The communication apparatus 102 and the communication apparatus 103 may establish connection in each channel in which connection is desired to be established, by transmitting and receiving an Association Request/Response in the corresponding channel. Alternatively, the communication apparatus 102 and the communication apparatus 103 may establish connection in a specific channel, and then transmit and receive an Association Request/Response including information regarding a different channel, via the specific channel. The communication apparatus 102 and the communication apparatus 103 may thereby establish connection in the different channel, via the established connection.

If connection has been established, in steps S404 and S506, the communication apparatus 102 determines a parameter related to transmission and reception in the established connection. In the present exemplary embodiment, the communication apparatus 102 determines a parameter related to transmission and reception in each of all the connections established with the communication apparatus 103.

The parameter related to transmission and reception specifically refers to the allocation of data to be transmitted and received in each connection. For example, the communication apparatus 102 determines the allocation of data to be allocated to each connection when the communication apparatus 102 transmits data to the communication apparatus 103 via a plurality of connections. The communication apparatus 102 determines an amount of data to be allocated to each connection, based on maximal throughput usable in a corresponding connection with the communication apparatus 103. Alternatively, instead of this, the communication apparatus 102 may determine an amount of data to be allocated to each connection, based on throughput calculated by actually transmitting a packet to the communication apparatus 103 via the corresponding connection. Specifically, after the communication apparatus 102 has transmitted and received data to and from the communication apparatus 103 for a predetermined time, the communication apparatus 102 may determine an amount of data to be newly allocated, in accordance with actual throughput in each connection and an amount of transmitted and received data. The communication apparatus 102 sets a larger amount of data to be allocated to a connection with higher throughput, than to a connection with lower throughput.

Alternatively, as a parameter related to transmission and reception, the communication apparatus 102 may determine the type of a frame to be communicated in the established connection, instead of or in addition to an amount of allocated data. Specifically, the communication apparatus 102 may separate a connection for communicating a management frame, and a connection for communicating a data frame including data. For example, the communication apparatus 102 may transmit and receive a management frame via a connection established in the 2.4-GHz band, and transmit and receive a data frame via a connection established in the 5-GHz band or the 6-GHz band.

Alternatively, as a parameter related to transmission and reception, the communication apparatus 102 may determine a connection to be used, in accordance with the type of data, in addition to or instead of the above-described parameters. For example, among pieces of data related to mixed reality or augmented reality, the communication apparatus 102 may determine to communicate data on position information, orientation information, and delay control information, which is control data, via a connection established in the 2.4-GHz band. In this case, the communication apparatus 102 determines to communicate data with a relatively-large data amount, such as content data and occlusion information indicating a shielding relationship between objects, via a connection established in the 5-GHz band or the 6-GHz band. Alternatively, in the case of data on a captured image, the communication apparatus 102 may determine to communicate metainformation such as dates, parameters (aperture value and shutter speed) in image capturing, and position information via a connection established in the 2.4-GHz band. In this case, the communication apparatus 102 may determine to communicate pixel information via a connection established in the 5-GHz band or the 6-GHz band. Alternatively, the communication apparatus 102 may determine one of a plurality of connections as a connection for backup. The communication apparatus 102 may notify the communication apparatus 103 of the determined parameter related to transmission and reception.

In the present exemplary embodiment, the communication apparatus 102 determines a parameter related to transmission and reception in each of the established connections, but a configuration is not limited to this. The communication apparatus 102 may perform transmission and reception of data without determining a parameter related to transmission and reception. In this case, step S404 of FIG. 4 and step S506 of FIG. 5 are skipped. In addition, the communication apparatus 102 may independently transmit and receive separate streams in a plurality of connections established with the communication apparatus 103.

Next, in step S405, the communication apparatus 102 transmits and receives data via the established connection. In a case where a parameter related to transmission and reception is determined in step S404, the communication apparatus 102 transmits and receives data to and from the communication apparatus 103 in accordance with the determined parameter. In FIG. 5, in steps S5071 and S5081, the communication apparatus 102 transmits and receives data to and from the communication apparatus 103 via the connection established in the 2.4-GHz band, and in steps S5072 and S5082, the communication apparatus 102 transmits and receives data to and from the communication apparatus 103 via the connection established in the 5-GHz band. In addition to this, in steps S5073 and S5083, the communication apparatus 102 also transmits and receives data to and from the communication apparatus 103 via the connection established in the 6-GHz band.

In addition, a connection via which communication can be performed which has been established between the communication apparatus 102 and the communication apparatus 103 may be called a link or a communication link.

In step S407, the communication apparatus 102 determines whether all connections with the communication apparatus 103 have been disconnected. In a case where at least one connection established with the communication apparatus 103 is maintained (No in step S407), the communication apparatus 102 determines No in this step. In addition, the communication apparatus 102 determines a connection via which data communication is performed again before a predetermined time elapses from when data is lastly communicated with the communication apparatus 103, to be maintained. In addition, data communicated at this time may be empty data including no content. Alternatively, in a case where the communication apparatus 102 receives or transmits an Action frame including a Disassociation element to be described below, via a connection with the communication apparatus 103, the communication apparatus 102 determines that the connection has been disconnected. Alternatively, in a case where a connection to be disconnected is designated in an Action frame including a Disassociation element that has been communicated with the communication apparatus 103, the communication apparatus 102 determines that the connection has been disconnected. In this case, a connection different from a connection via which an Action frame including a Disassociation element has been communicated is disconnected. In a case where the communication apparatus 102 determines No in this step, the communication apparatus 102 performs processing in step S405. In addition, a frame to be communicated may be a Deauthentication frame or a Disassociation frame instead of an Action frame. In a case where there is no data to be transmitted to or received from the communication apparatus 103, the communication apparatus 102 may perform the processing in step S407. Alternatively, in a case where the communication apparatus 102 determines No in this step, the communication apparatus 102 may perform the processing in step S406 concurrently with or instead of the processing in step S405, and wait for the reception of a new connection request from the communication apparatus 103. In a case where all the connections with the communication apparatus 103 have been disconnected (Yes in step S407), the communication apparatus 102 determines Yes in this step, and ends the processing of this flow.

As described above, by the processing illustrated in FIG. 4, the communication apparatus 102 establishes connections with the communication apparatus 103 via a plurality of channels, and executes multi-band communication. By establishing connections between the communication apparatus 102 and the communication apparatus 103 in a plurality of channels in accordance with one communication of an Association Request/Response, a communication volume of a frame in the establishment of a plurality of connections can be reduced. This can lower an occupancy rate of a frequency band in the establishment of a plurality of connections. In addition, by executing multi-band communication with the communication apparatus 103 via a plurality of connections, the communication apparatus 102 can communicate data more quickly as compared with a case of communicating data only via one connection.

Figure 8:
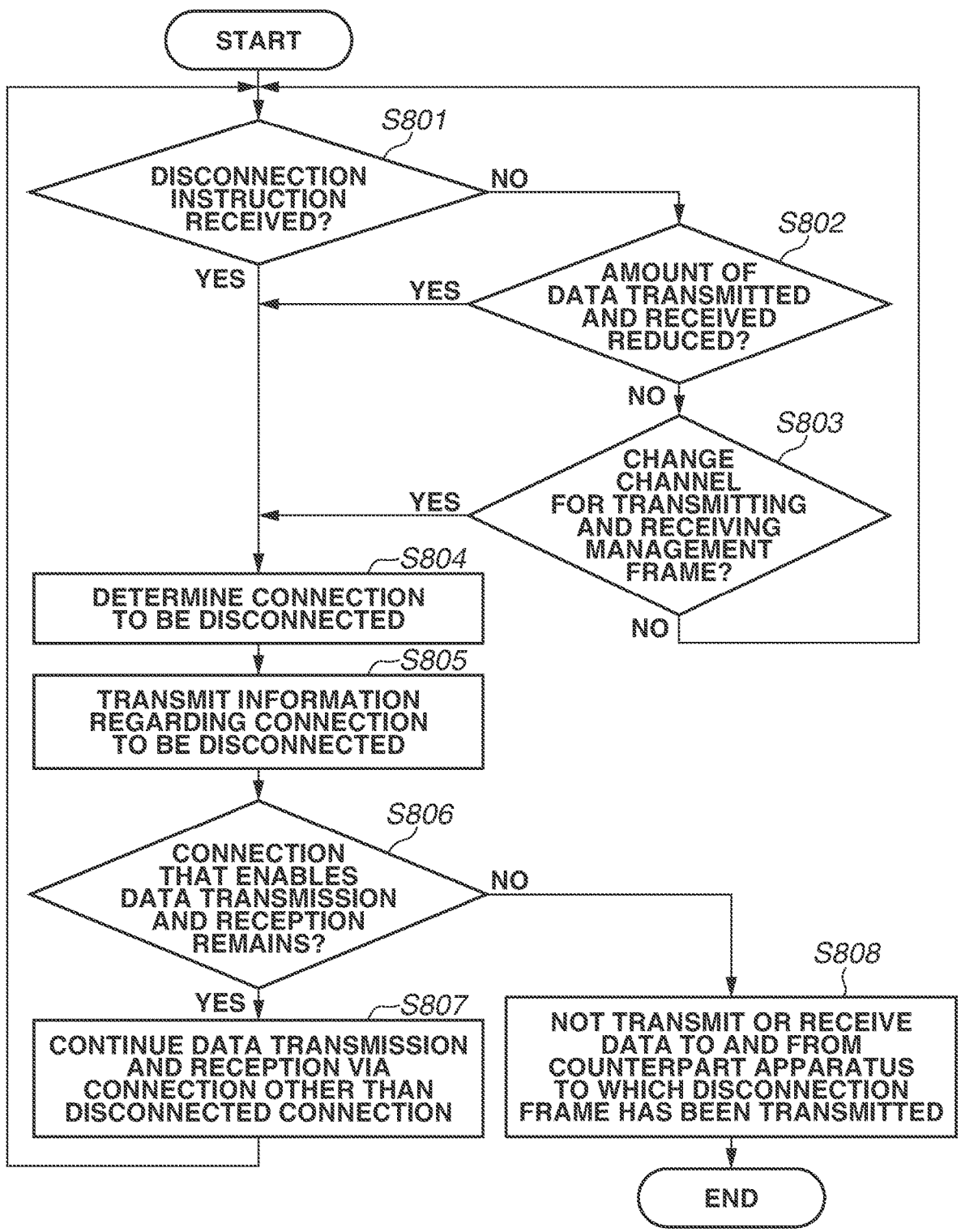
FIG. 8 is a flowchart illustrating processing to be executed when the communication apparatus 102 disconnects connection with the communication apparatus 103.
Figure 9:
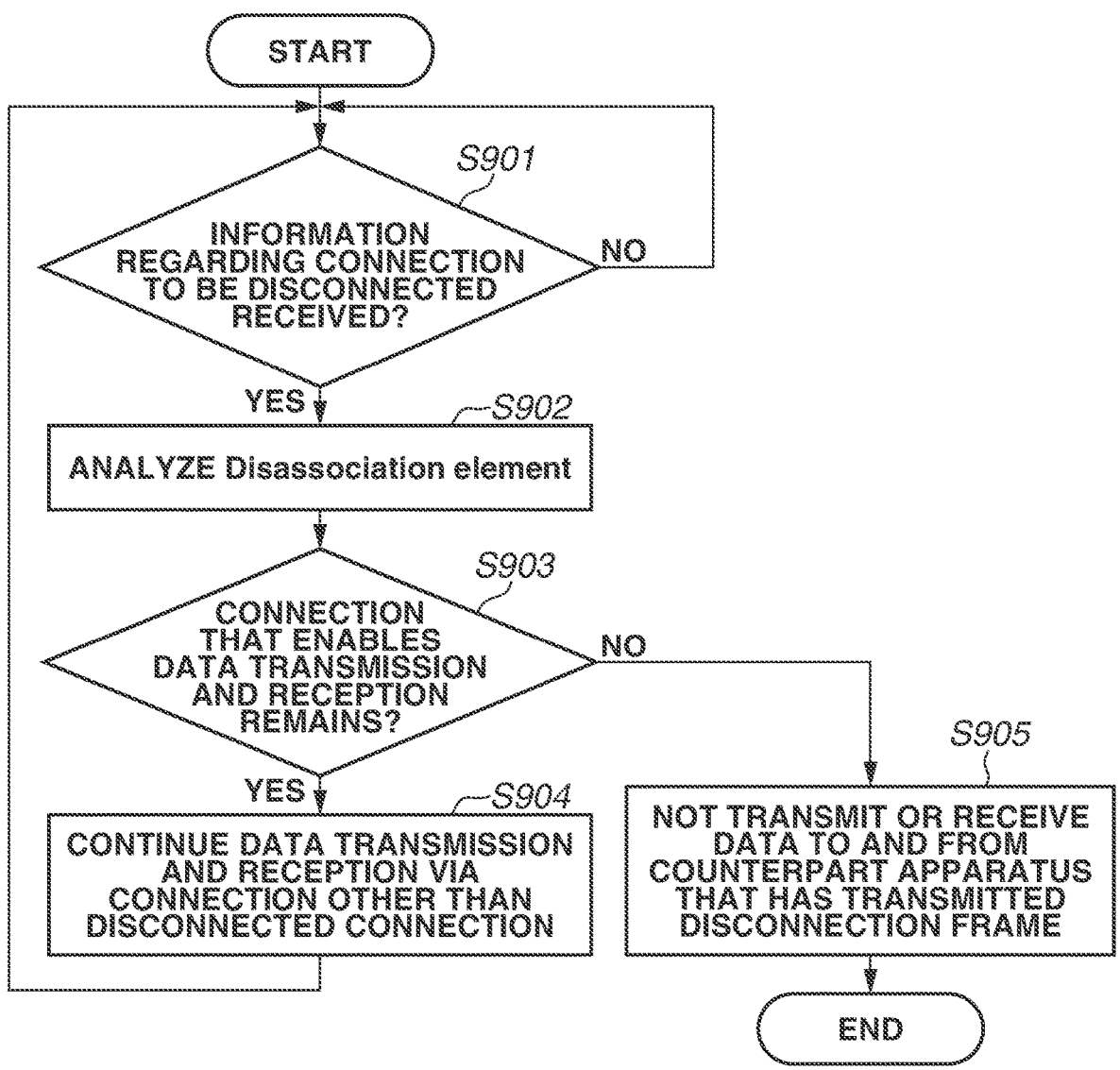
FIG. 9 is a flowchart illustrating processing to be executed when the communication apparatus 103 disconnects connection with the communication apparatus 102.

Next, a case where a connection between the communication apparatus 102 and the communication apparatus 103 is disconnected will be described. FIG. 8 is a flowchart illustrating processing to be executed by loading a computer program stored in the storage unit 301, onto the control unit 302, and executing the computer program, in a case where the communication apparatus 102 disconnects connection with the communication apparatus 103. FIG. 9 is a flowchart illustrating processing to be executed by loading a computer program stored in the storage unit 301, onto the control unit 302, and executing the computer program, in a case where the communication apparatus 103 disconnects connection with the communication apparatus 102. In addition, the processing illustrated in FIG. 8 may be executed by the communication apparatus 103, and the processing illustrated in FIG. 9 may be executed by the communication apparatus 102.

Figure 12:
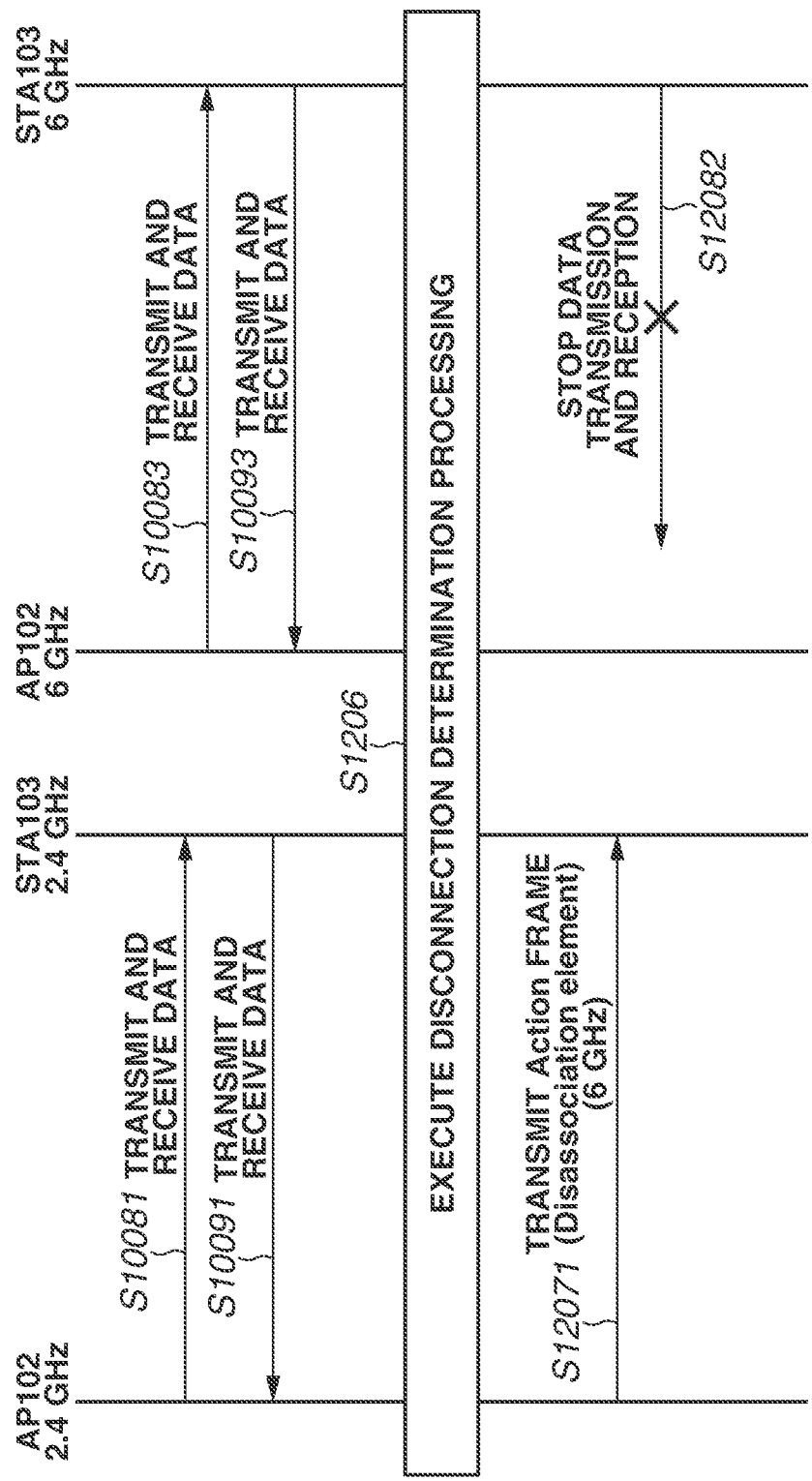
FIG. 12 is a sequence diagram illustrating another example of processing to be executed when the communication apparatus 102 disconnects connection with the communication apparatus 103.

In the present exemplary embodiment, the communication apparatus 102 and the communication apparatus 103 establish connections in the 2.4-GHz band, the 5-GHz band, and the 6-GHz band. The description will be given of an example case where the communication apparatus 102 disconnects a connection with the communication apparatus 103 in the 5-GHz band as illustrated in a sequence diagram in FIG. 10. In the present exemplary embodiment, the description will be given of an example case where, after the communication apparatus 102 disconnects the connection in the 5-GHz band, the communication apparatus 102 further disconnects a connection with the communication apparatus 103 in the 6-GHz band as illustrated in a sequence diagram in FIG. 12.

In a case where the communication apparatus 102 has established connections with the communication apparatus 103, the communication apparatus 102 starts processing illustrated in FIG. 8. In addition, in a case where the communication apparatus 103 has established connections with the communication apparatus 102, the communication apparatus 103 starts processing illustrated in FIG. 9.

In steps S5071 to S5073, and steps S5081 to S5083, the communication apparatus 102 and the communication apparatus 103 transmit and receive data to and from each other.

The communication apparatus 102 starts the processing of the flow illustrated in FIG. 8, and in step S801, determines whether a disconnection instruction has been received. In a case where a disconnection instruction has been received from the user (Yes in step S801), the communication apparatus 102 determines Yes in this step. The disconnection instruction from the user includes not only a disconnection instruction issued by the user operating a hardware key or a software key, but also a stop instruction of a predetermined application, a switch instruction of an application, a stop instruction of the power of the communication apparatus 102, and the like. Alternatively, in a case where a disconnection instruction has been received from an application operating on the communication apparatus 102, the communication apparatus 102 determines Yes in this step. Alternatively, the communication apparatus 102 may determine Yes in this step upon receiving a disconnection instruction from a STA different from the communication apparatus 103, or an AP, to which the communication apparatus 102 is connected. Alternatively, the communication apparatus 102 may determine Yes in this step if communication has not been performed before a predetermined time elapses from when communication has been lastly performed with the communication apparatus 103. Alternatively, the communication apparatus 102 may determine Yes in this step if received signal strength indication (RSSI) of radio waves in connection with the communication apparatus 103 becomes equal to or smaller than a predetermined threshold value. The communication apparatus 102 may perform the determination in this step by combining the above-described determination methods. Alternatively, the communication apparatus 102 may determine Yes in this step if the communication apparatus 103 serving as a STA establishes a connection with an AP different from the communication apparatus 102. In addition, a connection with the communication apparatus 103 may have already been established, or may be a connection to be established hereafter. In this case, the communication apparatus 102 determines Yes in the determination in this step in a case where Yes is determined by at least one determination method. In addition, in a case where the communication apparatus 102 establishes a plurality of connections with the communication apparatus 103, the communication apparatus 102 may execute the processing in this step for each connection. In a case where the communication apparatus 102 determines Yes in this step (Yes in step S801), the communication apparatus 102 performs processing in step S804. In a case where the communication apparatus 102 determines No in this step (No in step S801), the communication apparatus 102 performs processing in step S802.

In step S802, the communication apparatus 102 determines whether a data amount of data transmitted to and received from the communication apparatus 103 has reduced. Specifically, for the connection determined to be Yes in step S801, the communication apparatus 102 determines whether a data amount of data communicated via the connection has reduced. The communication apparatus 102 measures a data amount of data transmitted to and received from the communication apparatus 103, every predetermined time, in such a manner that a data amount can be compared in this step. In this case, in this step, the communication apparatus 102 compares a lastly-measured data amount and the previous data amount, and in a case where a difference therebetween is equal to or larger than a predetermined value, the communication apparatus 102 determines Yes in this step. Alternatively, in this step, the communication apparatus 102 may perform the determination based on whether the last data amount is equal to or smaller than a predetermined threshold value, instead of performing the determination based on a decrement of a data amount. In this case, in a case where the last data amount is equal to or smaller than a predetermined threshold value, the communication apparatus 102 determines Yes in this step. In a case where the communication apparatus 102 determines Yes in this step (Yes in step S802), the communication apparatus 102 performs the processing in step S804. In a case where the communication apparatus 102 determines No in this step (No in step S802), the communication apparatus 102 performs processing in step S803. In addition, the processing in step S802 may be skipped, and in this case, the communication apparatus 102 performs the processing in step S803 in a case where the communication apparatus 102 determines No in step S801.

Next, in step S803, the communication apparatus 102 determines whether to change a channel for transmitting and receiving a management frame. Specifically, in a case where the communication apparatus 102 designates a specific connection and transmits and receives a management frame, the communication apparatus 102 determines whether to change a connection for transmitting and receiving a management frame, from the specific connection. The communication apparatus 102 determines Yes in this step in a case where the RSSI of the connection via which a management frame is transmitted and received becomes equal to or smaller than a predetermined threshold value. Alternatively, the communication apparatus 102 determines Yes in this step in a case where throughput in the connection via which a management frame is transmitted and received becomes equal to or smaller than a predetermined threshold value. In addition, a threshold value used in the determination in step S803 is higher than a threshold value used in the determination in step S801. In a case where the communication apparatus 102 determines Yes in this step (Yes in step S803), the communication apparatus 102 performs the processing in step S804. In a case where the communication apparatus 102 determines No in this step (No in step S803), the communication apparatus 102 performs the processing in step S801. In addition, in a case where the communication apparatus 102 has not designated a connection for transmitting and receiving a management frame, the processing in this step may be skipped. In this case, in a case where the communication apparatus 102 determines No in step S802, the communication apparatus 102 performs the processing in step S801. In addition, in a case where the processing in both steps S802 and S803 is skipped, in a case where the communication apparatus 102 determines No in step S801, the communication apparatus 102 performs the processing in step S801 again.

In step S804, the communication apparatus 102 determines a connection to be disconnected. The communication apparatus 102 determines a connection determined to be Yes in any of steps S801, S802, and S803, to be disconnected. In this example, a case where the user has issued a disconnection instruction for a connection established by the communication apparatus 102 with the communication apparatus 103 in the 5-GHz band will be described. In this case, because the connection established in the 5-GHz band is determined to be Yes in step S801, in this step, the communication apparatus 102 determines the connection established in the 5-GHz band, as a connection to be disconnected.

Figure 10:
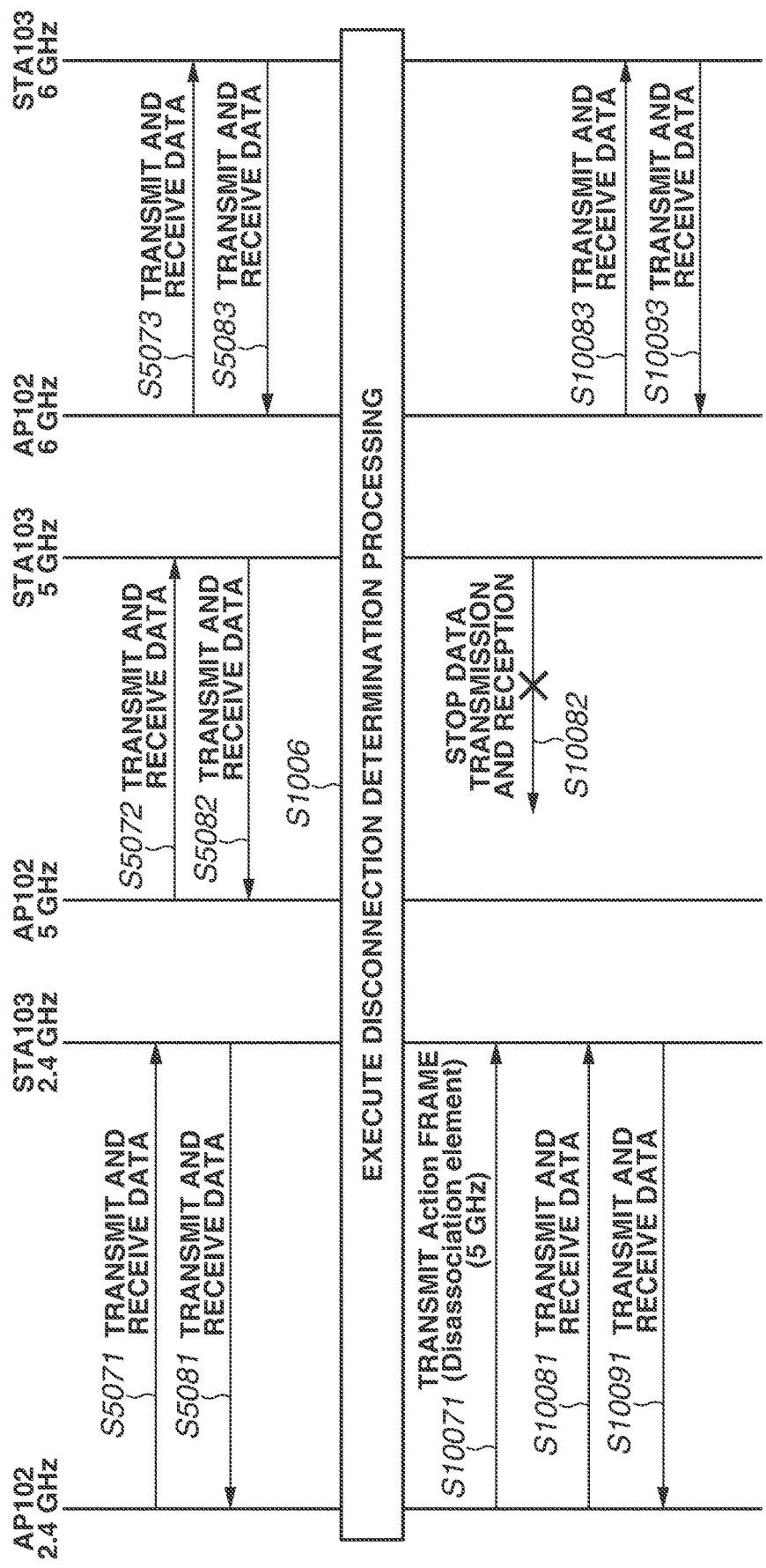
FIG. 10 is a sequence diagram illustrating an example of processing to be executed when the communication apparatus 102 disconnects connection with the communication apparatus 103.

Processing in step S1006 of FIG. 10 corresponds to the processing in steps S801 to S804 of FIG. 8 that is performed by the communication apparatus 102.

If the communication apparatus 102 determines a connection to be disconnected, in steps S805 and S10071, the communication apparatus 102 transmits a frame for requesting disconnection of the connection. The frame transmitted at this time includes information indicating the connection to be disconnected. In the present exemplary embodiment, the communication apparatus 102 transmits an Action frame including a Disassociation element, as a frame for requesting disconnection. In addition, in the present exemplary embodiment, the communication apparatus 102 transmits a frame for requesting disconnection of the connection in the 5-GHz band, via the connection in the 2.4-GHz band. If the communication apparatus 102 performs the processing in step S805, the communication apparatus 102 next performs processing in step S806.

FIG. 11 illustrates an example of a frame format of a Disassociation element included in an Action frame. The Disassociation element includes an Element ID 1101, a Length 1102, and a Multi-band Control 1103. The Disassociation element further includes fields of a Band ID 1104, an Operating Class 1105, and a Channel Number 1106. These fields are transmitted by the communication apparatus 102 and received by a different communication apparatus, in an order starting from the Element ID 1101 that is illustrated in FIG. 11. The communication apparatus 102 may transmit the fields of the Disassociation element to a different communication apparatus after generating all the fields, or may perform generation and transmission for each field in order from the Element ID 1101.

In addition, an order in which the fields are transmitted and received is not limited to the order illustrated in FIG. 11, and the order of the fields may be different. In addition, any of the fields may be omitted, or a field not illustrated in FIG. 11 may be added to a position between arbitrary fields.

The Element ID 1101 includes an identifier for identifying an element. In the present exemplary embodiment, a predetermined value is included as an identifier indicating that the element is the Disassociation element.

The Length 1102 includes information indicating a length of the Disassociation element that excludes the Element ID 1101 and the Length 1102.

The Multi-band Control 1103 includes information similar to the Multi-band Control 603. In addition, the Multi-band Control 1103 may be omitted.

The Band ID 1104 includes information for identifying a frequency band related to the Operating Class 1105 and the Channel Number 1106, which will be described below. In the present exemplary embodiment, the Band ID 1104 includes information indicating a frequency band of the connection determined in step S804 to be disconnected.

The Operating Class 1105 includes information indicating a set of channels including a channel of the connection determined in step S804 to be disconnected that are included in the frequency band indicated by the Band ID 1104.

The Channel Number 1106 includes information indicating a channel of the connection determined in step S804 to be disconnected.

In the present exemplary embodiment, a case where one connection is disconnected has been described as an example, but the disconnected connection is not limited to this, and a plurality of connections may be disconnected. In this case, the communication apparatus 102 may include, into one Disassociation element, information regarding a plurality of connections to be disconnected. Specifically, the communication apparatus 102 may include, into the Band ID 1104, the Operating Class 1105, and the Channel Number 1106, information regarding a plurality of connections.

Alternatively, the communication apparatus 102 may include information regarding one connection, into one Disassociation element. In this case, an Action frame includes a plurality of Disassociation elements.

In addition, in the present exemplary embodiment, the Disassociation element includes the Operating Class 1105 and the Channel Number 1106, but the format of the Disassociation element is not limited to this. The Disassociation element illustrated in FIG. 11 may include only the Channel Number 1106 without including the Operating Class 1105.

In addition, in the present exemplary embodiment, an Action frame including a Disassociation element is used as a frame for requesting disconnection, but the frame is not limited to this. The communication apparatus 102 may use a Deauthentication frame or a Disassociation frame. In this case, the communication apparatus 102 requests disconnection by transmitting a Deauthentication frame or a Disassociation frame including a Multi-band element including information regarding a connection to be disconnected. In addition, the fields from the Band ID 604 to the Channel Number 606 that are included in the Multi-band element in this case include information similar to the information included in the fields from the Band ID 1104 to the Channel Number 1106. In addition, the field of the BSSID 607 and subsequent fields may be omitted. In addition, also in a case where disconnection of a plurality of connections is requested, a plurality of Multi-band elements may be included similarly to the Disassociation element, or information regarding a plurality of connections may be included in one Multi-band element.

Alternatively, instead of the Multi-band element, another element may be included in a Deauthentication frame or a Disassociation frame. In this case, the element includes information indicating a channel of a connection to be disconnected, in addition to an identifier indicating the element and information indicating the length of the element.

If the communication apparatus 103 starts the processing of the flow illustrated in FIG. 9, in step S901, the communication apparatus 103 determines whether information regarding a connection to be disconnected has been received. Specifically, the communication apparatus 103 determines whether an Action frame including a Disassociation element has been received. In a case where the Action frame has been received (Yes in step S901), the communication apparatus 103 determines Yes in this step. In addition, in this step, the communication apparatus 103 may determine whether a Deauthentication frame or a Disassociation frame including a Multi-band element has been received. In a case where a Deauthentication frame or a Disassociation frame including a Multi-band element has been received, the communication apparatus 103 determines Yes in this step. Alternatively, the communication apparatus 103 may determine whether a Deauthentication frame or a Disassociation frame including another element different from the Multi-band element that includes information regarding a connection to be disconnected has been received. In a case where a Deauthentication frame or a Disassociation frame including the element has been received, the communication apparatus 103 determines Yes in this step. If the communication apparatus 103 determines No in this step (No in step S901), the communication apparatus 103 performs the processing in step S901 again. On the other hand, if the communication apparatus 103 determines Yes in this step (Yes in step S901), the communication apparatus 103 performs processing in step S902.

In step S902, the communication apparatus 103 analyzes the received Disassociation element. In addition, in a case where the received element is a Multi-band element or another element, the communication apparatus 103 analyzes the received element. In this step, the communication apparatus 103 identifies a connection requested to be disconnected. In the present exemplary embodiment, the communication apparatus 103 identifies a connection established in the 5-GHz band, as a connection requested to be disconnected.

Next, in step S903, the communication apparatus 103 determines whether a connection with the communication apparatus 102 that enables data transmission and reception remains. The communication apparatus 103 determines whether a connection that enables data transmission and reception with the communication apparatus 102 exists aside from the connection for which a disconnection request has been issued from the communication apparatus 102. In a case where a connection that enables data transmission and reception remains (Yes in step S903), the communication apparatus 103 determines Yes in this step. If the communication apparatus 103 determines Yes in this step (Yes in step S903), the communication apparatus 103 performs processing in step S904. If the communication apparatus 103 determines No in this step (No in step S903), the communication apparatus 103 performs processing in step S905.

Similarly, after performing the processing in step S805, in step S806, the communication apparatus 102 also determines whether a connection with the communication apparatus 103 that enables data transmission and reception remains. The communication apparatus 102 determines whether a connection that enables data transmission and reception with the communication apparatus 103 exists aside from the connection for which a disconnection request has been issued. In a case where a connection that enables data transmission and reception remains (Yes in step S806), the communication apparatus 102 determines Yes in this step. If the communication apparatus 102 determines Yes in this step (Yes in step S806), the communication apparatus 102 performs processing in step S807. If the communication apparatus 102 determines No in this step (No in step S806), the communication apparatus 102 performs processing in step S808.

In a case where a connection that enables data transmission and reception remains (Yes in steps S806 and S903), in steps S807 and S904, the communication apparatus 102 and the communication apparatus 103 continue data transmission and reception via the connection. In this case, data transmission and reception between the communication apparatus 102 and the communication apparatus 103 via the connection (channel) requested to be disconnected is stopped. In the present exemplary embodiment, because the connection in the 5-GHz band has been disconnected, in step S10082, data transmission and reception via the connection in the 5-GHz band are stopped. In addition, in the present exemplary embodiment, because the connections in the 2.4-GHz band and the 6-GHz band are maintained, in steps S10081, S10091, S10083, and S10093, data transmission and reception in the 2.4-GHz band and the 6-GHz band are continued. If the communication apparatus 102 performs the processing in this step, the communication apparatus 102 performs the processing in step S801. If the communication apparatus 103 performs the processing in this step, the communication apparatus 103 performs the processing in step S901.

In the example illustrated in FIG. 10, because connections between the communication apparatus 102 and the communication apparatus 103 that enable data transmission and reception remain, Yes is determined in steps S806 and S903. In step S1206 of FIG. 12, the communication apparatus 102 performs the processing in steps S801 to S804, and determines that the connection in the 6-GHz band is to be disconnected. In steps S805 and S12071, the communication apparatus 102 transmits a frame for requesting disconnection of the connection in the 6-GHz band, to the communication apparatus 103 via the connection in the 2.4-GHz band. If the communication apparatus 103 receives a frame for requesting disconnection, from the communication apparatus 102, the communication apparatus 103 performs the processing in steps S901 and S902. The communication apparatus 102 and the communication apparatus 103 perform the determination in steps S806 and S903, respectively. In the present exemplary embodiment, because the connection in the 2.4-GHz band still remains between the communication apparatus 102 and the communication apparatus 103, the communication apparatus 102 and the communication apparatus 103 determine Yes in these steps. In this case, in step S12082, communication via the connection in the 6-GHz band between the communication apparatus 102 and the communication apparatus 103 is stopped.

In a case where it is determined to be No in step S806, in step S808, the communication apparatus 102 does not perform data transmission and reception with a counterpart apparatus (the communication apparatus 103 in this example) to which a disconnection frame has been transmitted, and ends the processing of this flow. Similarly, in a case where it is determined to be No in step S903, in step S905, the communication apparatus 103 does not perform data transmission and reception with a transmission apparatus (the communication apparatus 102 in this example) of a disconnection frame, and ends the processing of this flow.

As described above, by the processing illustrated in FIGS. 8 and 9, the communication apparatus 102 and the communication apparatus 103 disconnect connections. As described above, by transmitting a frame for requesting disconnection, via a connection different from a connection desired to be disconnected, for example, even in a case where interference with different communication occurs in the connection desired to be disconnected, the frame for requesting disconnection can be transmitted to the counterpart apparatus.

In addition, in a case where the communication apparatus 102 determines Yes in step S803 of FIG. 8, and disconnects a connection with the communication apparatus 103, the communication apparatus 102 may establish a new connection with the communication apparatus 103. When transmitting information regarding a connection to be disconnected, in step S805, the communication apparatus 102 may also transmit information regarding a new channel to be used for transmission and reception of a control frame. Then, the communication apparatus 102 may establish a connection with the communication apparatus 103 via the new channel, and use the connection for transmission and reception of the control frame. Alternatively, in a case where the communication apparatus 102 transmits information regarding a connection to be disconnected, in step S805, the communication apparatus 102 may also notify the communication apparatus 103 of information indicating that a change in a connection to be used for transmission and reception of a control frame is requested. The communication apparatus 103 that has received the change request may request the communication apparatus 102 to establish a connection via a new frequency channel, together with or after the disconnection of the connection with the communication apparatus 102 that has been designated in step S805. Specifically, the communication apparatus 103 transmits an Association Request in which a new frequency channel is designated, to the communication apparatus 102. Alternatively, in a case where the communication apparatus 102 determines Yes in step S806, the communication apparatus 102 may use any one of the remaining connections with the communication apparatus 103, as a new connection for transmitting and receiving a control frame. In this case, the communication apparatus 102 may notify the communication apparatus 103 of a connection to be used as a connection for transmitting and receiving a control frame, at any timing in step S805 or subsequent steps.

In the present exemplary embodiment, a case where multi-band communication is performed between the communication apparatus 102 (AP) and the communication apparatus 103 (STA) has been described, but the configuration of multi-band communication is not limited to this, and multi-band communication may be performed between STAs. With this configuration, even in a connection between a plurality of STAs not via an AP, communication via a plurality of connections in different channels can be executed. In addition, in a case where multi-band communication as in the present exemplary embodiment is performed between STAs, one STA may have a role of constructing a network like the communication apparatus 102 (AP) of the present exemplary embodiment, and perform processing similar to the communication apparatus 102. In addition, the other STA may have a role of participating in the network like the communication apparatus 103 (STA) of the present exemplary embodiment, and perform processing similar to the communication apparatus 103.

In the present exemplary embodiment, a frame for requesting disconnection is transmitted from the communication apparatus 102 serving as an AP, to the communication apparatus 103 serving as a STA, but in addition to or instead of this, a frame for requesting disconnection may be transmitted from a STA to an AP. In a case where a frame for requesting disconnection can be transmitted from both the STA and the AP, disconnection control of each connection can be performed bidirectionally.

In addition, in the present exemplary embodiment, a case where a connection is established and then disconnected has been described as an example, but the configuration is not limited to this. In a case where an error occurs during connection processing in a certain channel, the communication apparatus 102 may report the occurrence of the error by requesting disconnection in the channel via a different connection. For example, a case where the communication apparatus 102 has already established a connection with the communication apparatus 103 in a first channel in the 5-GHz band, and is executing connection processing for further establishing a connection in a second channel in the 2.4-GHz band will be considered. In such a case, for example, in a case where an error occurs in the connection processing in the second channel by the occurrence of interference with different communication or the like, the communication apparatus 102 transmits a frame for requesting disconnection of the connection in the second channel, via the connection in the first channel. The communication apparatus 103 that has received the frame for requesting disconnection of the connection in the second channel can detect that an error of some sort has occurred in the ongoing connection processing in the second channel, and end the connection processing. In addition, the case where an error occurs during connection processing includes a case where a frame different from a frame to be transmitted and received in connection processing has been received, a case where a wrong value is included in a frame, and the like aside from the above-described case. The communication apparatus 102 may notify the communication apparatus 103 of content and the cause of the error by including information indicating the content and the cause of the error, into the frame for requesting disconnection of the connection in the second channel.

In addition, in addition to or instead of the case where an error occurs during connection processing, in a case where a request for connection in a specific channel of which the use is restricted in a predetermined area has been received, a connection response for notifying an error may be transmitted via a connection already established in a different channel. For example, a case where the communication apparatus 102 has already established a connection with the communication apparatus 103 in a channel in the 5-GHz band will be considered. In a case where the communication apparatus 102 has received a connection request from the communication apparatus 103 via a 14 ch of the 2.4-GHz band in an area in which the use of the 14 ch is restricted, a connection response for notifying an error may be transmitted to the communication apparatus 103 via the connection established in the 5-GHz band. In this case, the communication apparatus 102 may transmit an Association Response including "UNACCEPTABLE_SUPPORTED_CHANNELS" as an error code.

In addition, in the present exemplary embodiment, FIGS. 6 and 11 each illustrate an example of a frame format of an element for controlling connection or disconnection of multi-band communication, but a frame format of each element is not limited to this.

Figure 13:
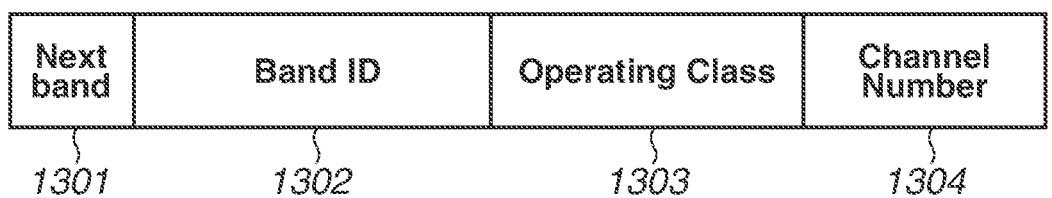
FIG. 13 is a diagram illustrating another example of a Band ID field to be communicated by the communication apparatus 102.

FIG. 13 illustrates another example of a Band ID field of the elements illustrated in FIGS. 6 and 11. Specifically, in the case of the Multi-band element, instead of the fields from the Band ID 604 to the Channel Number 606 that are illustrated in FIG. 6, fields from a Next Band 1301 to a Channel Number 1304 that are illustrated in FIG. 13 may be included. In this case, an Operating Class 1303 and the Channel Number 1304 in FIG. 13 include the same information as the Operating Class 605 and the Channel Number 606 that are illustrated in FIG. 6, respectively. Similarly, in the case of the disassociation element, instead of the fields from the Band ID 1104 to the Channel Number 1106 that are illustrated in FIG. 11, the fields from the Next Band 1301 to the Channel Number 1304 that are illustrated in FIG. 13 may be included. In this case, the Operating Class 1303 and the Channel Number 1304 in FIG. 13 include the same information as the Operating Class 1105 and the Channel Number 1106 that are illustrated in FIG. 11, respectively.

Each of the Band ID fields illustrated in FIGS. 6 and 11 is a field including eight bits. Thus, in a case where a Next Band field and Band ID field are used instead, the Next Band field may include one bit and the Band ID field may include seven bits.

FIG. 13 further illustrates a correspondence relationship between a value in the Band ID field and the meaning thereof in the frame format illustrated in FIG. 13. The correspondence relationship illustrated in FIG. 13 does not include a value indicating a plurality of frequency bands.

In a case where the frame format illustrated in FIG. 13 is used, in a case where the fields from the Next Band 1301 to the Channel Number 1304 are regarded as one set, information regarding one connection is included in one set. Thus, in a case where information regarding a plurality of connections is communicated using each element, the element includes the same number of sets of the fields from the Next Band 1301 to the Channel Number 1304 as the number of connections. For example, in a case where a plurality of sets is included in the Multi-band element, the fields from the Next Band 1301 to the Channel Number 1304 of the second set are included following the Channel Number 1304 of the first set. Then, the field of the BSSID 607 is included following the Channel Number 1304 of the last set. Similarly, also in a case where a plurality of sets is included in the disassociation element, the fields from the Next Band 1301 to the Channel Number 1304 of the next set are included following the Channel Number 1304 of the first set. Then, the Channel Number 1304 of the last set becomes the last field included in the disassociation element.

The Next Band 1301 is information indicating whether information regarding a connection different from the connection indicated by the fields from the Band ID 1302 to the Channel Number 1304 that exist immediately after the Next Band 1301 is included in the element. In a case where 1 is included in the Next Band 1301, the element includes another set of fields from the Next Band 1301 to the Channel Number 1304 subsequently to the fields from the Band ID 1302 to the Channel Number 1304 that exist immediately after the Next Band 1301. On the other hand, in a case where 0 is included in the Next Band 1301, the element does not include another set of fields from the Next Band 1301 to the Channel Number 1304 subsequently to the fields from the Band ID 1302 to the Channel Number 1304 that exist immediately after the Next Band 1301. In addition, a correspondence relationship between a value included in the Next Band 1301 and the meaning thereof is not limited to this.

In addition, as for the element illustrated in FIG. 13, similarly to FIG. 11, only the Channel Number 1304 may be included without including the Operating Class 1303.

FIG. 14 illustrates an example of a frame format of a part of a Multi-band element in a case where a predetermined value is included in a Next Band field. FIG. 14 illustrates only a part corresponding to the fields from the Multi-band Control 603 to the BSSID 607 that are illustrated in FIG. 6.

FIG. 14A illustrates an example case where a value in the first Next band field is 0. In this case, the Multi-band element includes only one set of fields from the Next Band 1301 to the Channel Number 1304. In other words, the Multi-band element includes only information regarding one connection. In addition, the BSSID 607 follows the Channel Number 1304.

FIG. 14B illustrates an example case where a value in the first Next band field is 1, and a value in the second Next band field is 0. In this case, the Multi-band element includes two sets of fields from the Next Band 1301 to the Channel Number 1304. In addition, because the second set of fields from the Next Band to the Channel Number indicates information regarding a channel different from that of the first set, these fields are indicated as fields from a Next Band 1301' to a Channel Number 1304'. In this case, the Multi-band element includes information regarding two connections. The first set of fields from the Next Band 1301 to the Channel Number 1304 indicates information regarding a first channel, and the second set of fields from the Next Band 1301' to the Channel Number 1304' indicates information regarding a second channel. In addition, the BSSID 607 follows the Channel Number 1304'.

Similarly, in a case where an element includes information regarding three connections, the communication apparatus 102 is only required to set 1 as values of the first and second Next Band fields, and set 0 as a value of the third Next Band field. In addition, the number of connections that can be included in an element is not limited to this, and may be four or more.

In addition, instead of or in addition to the extension of a Band ID field as illustrated in FIG. 13, the communication apparatus 102 may extend a Channel Number field. In this case, a leading one bit of the Channel Number field illustrated in FIG. 6 or 11 becomes a Next Channel field. In a case where the communication apparatus 102 includes information regarding a plurality of channels included in the same frequency band, into an element, the communication apparatus 102 may include a plurality of Next Channel fields and a plurality of Channel Number fields, into the element. For example, a case where the communication apparatus 102 transmits an element including information regarding a first channel and a second channel in the 5-GHz band will be considered. In this case, the communication apparatus 102 transmits an Operating Class field indicating a set of channels including the first channel and the second channel, subsequently to a Band ID field including information indicating the 5-GHz band. Then, the communication apparatus 102 first transmits a Next Channel field including 1 as a value, and further continuously transmits a Channel Number field indicating the first channel Next, the communication apparatus 102 transmits a Next Channel field including 0 as a value, and continuously transmits a Channel Number field indicating the second channel. In this manner, in the case of communicating information regarding a plurality of channels included in the same frequency band, by repeating only a Next Channel field and a Channel Number field, information regarding a plurality of channels can be notified with a reduced number of bits.

Alternatively, in addition to or instead of this, an Operating Class field may be extended to a Next Class field and a Channel Number field. In a case where the communication apparatus 102 includes information regarding a plurality of sets of channels included in the same frequency band, into an element, the communication apparatus 102 may include a plurality of Next Class fields, a plurality of Operating Class fields, and a plurality of Channel Number fields, into the element. For example, a case where the communication apparatus 102 transmits an element including information regarding a first channel and a second channel in the 5-GHz band will be considered. In addition, the first channel and the second channel belong to different sets in the sets of channels indicated by the Operating Class. In this case, the communication apparatus 102 first transmits a Next Class field including 1 as a value, subsequently to a Band ID field including information indicating the 5-GHz band. Next, the communication apparatus 102 transmits an Operating Class field indicating a set of channels including the first channel, and transmits a Channel Number field indicating the first channel. Furthermore, the communication apparatus 102 transmits a Next Class field including 0 as a value, and then transmits an Operating Class field indicating a set of channels including the second channel. Subsequently to this, the communication apparatus 102 transmits a Channel Number field indicating the second channel. In this manner, in the case of communicating information regarding a plurality of sets of channels included in the same frequency band, by repeating only fields from a Next Class field to a Channel Number field, information regarding a plurality of sets of channels can be notified with a reduced number of bits.

As described above, FIG. 13 illustrates another example of a Band ID field included by the communication apparatus 102 into each element. By using the frame format as illustrated in FIG. 13, when information regarding a plurality of channels is communicated, the information can be communicated with a smaller number of bits.

In the present exemplary embodiment, each element includes information regarding a channel as information for identifying a connection, but the identification information is not limited to this. An association identifier (AID) may be used instead of information regarding a channel. The AID is an identifier allocated to a STA by an AP when the STA associates with the AP (the communication apparatus 102). In the present exemplary embodiment, the AP may make connections identifiable by varying an AID to be allocated to the same STA for each connection of a different channel. For example, a case where the communication apparatus 102 establishes connections with the communication apparatus 103 in the 2.4-GHz band and the 5-GHz band will be considered. In such a case, by allocating an AID=1 to the communication apparatus 103 in the 2.4-GHz band and allocating an AID=2 to the communication apparatus 103 in the 5-GHz band, the communication apparatus 102 can identify connections using the AIDs. Thus, as information for identifying a connection that is included in each element, an AID may be included instead of information regarding a channel of the connection. The communication apparatus 102 can thereby reduce the number of bits when communicating information regarding a connection, using each element.

In addition, in the present exemplary embodiment, even in a case where a plurality of connections is established, a common SSID and a common BSSID are set, but the configuration is not limited to this. The communication apparatus 102 may set different BSSIDs for the respective connections. In addition, the communication apparatus 102 may use different SSIDs in the different connections.

In addition, in the present exemplary embodiment, by transmitting and receiving a connection request or a disconnection request via a first frequency channel, the communication apparatuses 102 and 103 can control establishment or disconnection of a connection via a second frequency channel, but the configuration is not limited to this. The communication apparatuses 102 and 103 are only required to be able to execute at least one of establishment or disconnection of a connection via the second frequency channel, by communicating a predetermined signal via the first frequency channel.

In addition, in the present exemplary embodiment, all of a plurality of connections established between the communication apparatuses 102 and 103 are connections complying with the IEEE 802.11be standard, but the standard is not limited to this. As connections for multi-band communication, connections complying with a plurality of different standards of the IEEE 802.11 series standards may be established between the communication apparatuses 102 and 103. For example, as connections for multi-band communication, the communication apparatuses 102 and 103 may establish a connection complying with the IEEE 802.11be standard and a connection complying with the IEEE 802.11ax standard.

In addition, in the present exemplary embodiment, the communication apparatuses 102 and 103 perform multi-band communication by establishing connections complying with the IEEE 802.11 series standard, but the standard is not limited to this. The communication apparatuses 102 and 103 may perform multi-band communication by establishing a plurality of connections with different frequencies that comply with a communication standard different from the IEEE 802.11 series standard.

In addition, at least part or all of the processing to be executed by the communication apparatus 102 and the communication apparatus 103 in the flowcharts illustrated in FIGS. 4, 8, and 9 may be implemented by hardware. In a case where the processing is implemented by hardware, it is sufficient that a dedicated circuit is generated on a field programmable gate array (FPGA) from a computer program for implementing each step, by using a predetermined compiler, for example, and the dedicated circuit is used. The FPGA stands for a field programmable gate array. In addition, a gate array circuit may be formed and implemented as hardware similarly to the FPGA. In addition, the processing may be implemented by an application specific integrated circuit (ASIC).

An exemplary embodiment of the present invention can also be implemented by processing of supplying a program for implementing one or more functions of the above-described exemplary embodiment, to a system or an apparatus via a network or a storage medium, and one or more processors in a computer of the system or the apparatus reading out the program and executing the program. In addition, an exemplary embodiment of the present invention can also be implemented by a circuit (for example, ASIC) implementing one or more functions.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, connection with a different communication apparatus in a frequency channel different from a frequency channel in which a communication apparatus transmits a signal can be appropriately controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A station (STA) being able to execute wireless communication complying with the Institute of Electrical and Electronics Engineers (IEEE) 802.11 standard series, and the STA comprising:
a first transmitting unit configured to transmit, to an access point (AP), via a first channel, an Association Request frame which requests a connection with the AP on the first channel and a connection with the AP on a second channel;
a first receiving unit configured to receive, from the AP via the first channel, an Association Response frame including information indicating that the connection on the first channel is accepted and information indicating that the connection on the second channel is accepted,
wherein the Association Request frame includes information indicating a MAC address used for a communication with the AP via the first channel and information indicating a MAC address used for a communication with the AP via the second channel, and the MAC address used for the communication with the AP via the first channel included in the Association Request frame is different from the MAC address used for the communication with the AP via the second channel included in the Association Request frame, and
wherein the Association Response frame includes information indicating a MAC address used for the communication with the AP via the first channel and information indicating a MAC address used for the communication with the AP via the second channel, and the MAC address used for the communication with the AP via the first channel included in the Association Response frame is different from the MAC address used for the communication with the AP via the second channel included in the Association Response frame.

2. The STA according to claim 1, wherein a Service Set Identifier (SSID) of a network constructed by the AP on the first channel is same as the SSID of a network constructed by the AP on the second channel.

3. The STA according to claim 1, wherein the MAC address is a MAC address of the AP.

4. The STA according to claim 1, wherein the first channel is a channel in a 2.4-gigahertz (GHz) band and the second channel is a channel in a 5-GHz band.

5. The STA according to claim 1, wherein, in a case where the STA requests, to the AP, the connection on the first channel, the connection on the second channel and a connection on a third channel,
the first transmitting unit transmits, to the AP via the first channel, the Association Request frame which requests the connection with the AP on the first channel, the connection with the AP on the second channel and the connection with the AP on the third channel,
the first receiving unit receives, from the AP via the first channel, the Association Response frame which includes the information indicating that the connection on the first channel is accepted, the information indicating that the connection on the second channel is accepted and the information indicating that the connection on the third channel is accepted, and
wherein the Association Response frame includes information indicating the MAC address used for the communication with the AP via the second channel and an MAC address used for communication with the AP via the third channel.

6. The STA according to claim 1, further comprising:
a second transmitting unit configured to transmit a probe request; and
a second receiving unit configured to receive a probe response frame transmitted by the AP as a response to the probe request.

7. The STA according to claim 1, wherein the STA further comprises a third receiving unit configured to receive, a Beacon frame transmitted by the AP, via the first channel.

8. The STA according to claim 1, wherein the Association Response frame includes an Operating Class field and a Channel Number field as information for uniquely identifying the second channel.

9. The STA according to claim 1, further comprising a second transmitting unit configured to transmit, to the AP via the first channel, notification information causing disconnection of the connection on the first channel and disconnection of the connection on the second channel, the notification information including the information indicating the MAC address used for the communication with the AP via the first channel and not including the information indicating the MAC address used for the communication with the AP via the second channel, and the MAC address for the communication with the AP via the first channel included in the notification information is different from the MAC address for the communication with the AP via the second channel.

10. The STA according to claim 9, wherein the second transmitting unit transmits the notification information using a Deauthentication frame or a Disassociation frame.

11. The STA according to claim 9, wherein the notification information is included in a Deauthentication element or a Disassociation element.

12. The STA according to claim 9, wherein the second transmitting unit transmits the notification information by a wireless communication complying with the IEEE 802.11 be standard.

13. The STA according to claim 9, wherein the notification information includes information indicating a reason for which the notification information has been generated.

14. The STA according to claim 9, further comprising a reception unit configured to receive a disconnection instruction from a user, wherein the second transmitting unit transmits the notification information in response to the reception of the disconnection instruction by the reception unit.

15. The STA according to claim 9, wherein the notification information includes information indicating the disconnection of the connection on the first channel and information indicating the disconnection of the connection on the second channel.

16. The STA according to claim 9, wherein the first channel and the second channel are channels in different frequency bands.

17. A control method for executing wireless communication complying with the Institute of Electrical and Electronics Engineers (IEEE) 802.11 standard series, the control method comprising:
transmitting, to an access point (AP), via a first channel, an Association Request frame which requests a connection with the AP on the first channel and a connection with the AP on a second channel;

receiving, from the AP via the first channel, an Association Response frame including information indicating that the connection on the first channel is accepted and information indicating that the connection on the second channel is accepted, wherein the Association Request frame includes information indicating a MAC address used for a communication with the AP via the first channel and information indicating a MAC address used for a communication with the AP via the second channel, and the MAC address used for the communication with the AP via the first channel included in the Association Request frame is different from the MAC address used for the communication with the AP via the second channel included in the Association Request frame, and wherein the Associated Response frame includes information indicating a MAC address used for the communication with the AP via the first channel and information indicating a MAC address used for the communication with the AP via the second channel, and the MAC address used for the communication with the AP via the first channel included in the Association Response frame is different from the MAC address used for the communication with the AP via the second channel included in the Association Response frame.

18. An access point (AP) being able to execute wireless communication complying with the Institute of Electrical and Electronics Engineers (IEEE) 802.11 standard series, and the AP comprising:

a first receiving unit configured to receive, from a station (STA) via a first channel, an Association Request frame which requests a connection on the first channel and a connection on a second channel;

a first transmitting unit configured to transmit, to the STA via the first channel, an Association Response frame including information indicating that the connection on the first channel is accepted and information indicating that accepts the connection on the second channel is accepted, wherein the Association Request frame includes information indicating a MAC address used for a communication with the STA via the first channel and information indicating a MAC address used for a communication with the STA via the second channel, and the MAC address used for the communication with the STA via the first channel included in the Association Request frame is different from the MAC address used for the communication with the STA via the second channel included in the Association Request frame, wherein the Association Response frame includes information indicating a MAC address used for the communication with the STA via the first channel and information indicating a MAC address used for communication with the STA via the second channel, and the MAC address used for the communication with the STA via the first channel included in the Association Response frame is different from the MAC address used for the communication with the STA via the second channel included in the Association Response frame.

19. The AP according to claim 18, wherein a Service Set Identifier (SSID) of a network on the first channel established by the AP is same as the SSID of the network on the second channel established by the AP.

20. The AP according to claim 18, wherein the MAC address is a MAC address of the AP.

21. The AP according to claim 18, wherein the first channel is a channel in a 2.4-gigahertz (GHz) band and the second channel is a channel in a 5-GHz band.

22. The AP according to claim 18, wherein, in a case where the first receiving unit receives, from the STA via the first channel, the Association Request frame which requests the connection on the first channel, the connection on the second channel and a connection on a third channel, the first transmitting unit transmits, to the STA via the first channel, the Association Response frame which includes the information indicating that the connection on the first channel is accepted, the information indicating that the connection on the second channel is accepted and information indicating that the connection on the third channel is accepted, and wherein the Association Response frame includes the information indicating the MAC address used for the communication with the STA via the second channel and a MAC address used for communication with the STA via the third channel.

23. The AP according to claim 18, further comprising:

a second receiving unit configured to receive a probe request from the STA via the first channel; and a second transmitting unit configured to transmit a probe response frame to the STA as a response to the probe request, via the first channel.

24. The AP according to claim 18, further comprising a third transmitting unit configured to transmit a Beacon frame via the first channel.

25. The AP according to claim 18, wherein the Association Response frame includes an Operating Class field and a Channel Number field as information for uniquely identifying the second channel.

26. The AP according to claim 18 wherein the first channel and the second channel are channels in different frequency bands.

27. The AP according to claim 18, further comprising a second receiving unit configured to receive, from the STA via the first channel, notification information causing disconnection of the connection on the first channel and disconnection of the connection on the second channel, the notification information including the information indicating the MAC address used for the communication with the STA via the first channel and not including the information indicating the MAC address used for the communication with the STA via the second channel, and the MAC address for the communication with the STA via the first channel included in the notification information is different from the MAC address for the communication with the STA via the second channel.

28. The AP according to claim 27, further comprising a disconnection unit configured to disconnect the connection on the first channel and the connection on the second channel in response to the second receiving unit receiving the notification information.

29. The AP according to claim 27, wherein the notification information is included in a Deauthentication frame or a Disassociation frame.

30. The AP according to claim 27, wherein the notification information is included in a Deauthentication element or a Disassociation element.

31. The AP according to claim 27, wherein the notification information includes information indicating a reason for which the notification information is generated.

32. The AP according to claim 27, wherein the notification information includes information indicating the disconnection of the connection on the first channel and information indicating the disconnection of the connection on the second channel.

33. The AP according to claim 27, wherein the first channel and the second channel are channels in different frequency bands.

34. A control method for executing wireless communication complying with the Institute of Electrical and Electronics Engineers (IEEE) 802.11 standard series, the control method comprising:
  receiving, from a station (STA) via a first channel, an Association Request frame which requests a connection on the first channel and a connection on a second channel;
  transmitting, to the STA via the first channel, an Association Response frame including information indicating that the connection on the first channel is accepted and information indicating that accepts the connection on the second channel is accepted,
  wherein the Association Request frame includes information indicating a MAC address used for a communication with the STA via the first channel and information indicating a MAC address used for a communication with the STA via the second channel, and the MAC address used for the communication with the STA via the first channel included in the Association Request frame is different from the MAC address used for the communication with the STA via the second channel included in the Association Request frame, and
  wherein the Association Response frame includes information indicating a MAC address used for the communication with the STA via the first channel and information indicating a MAC address used for communication with the STA via the second channel, and the MAC address used for the communication with the STA via the first channel included in the Association Response frame is different from the MAC address used for the communication with the STA via the second channel included in the Association Response frame.

* * * * *